US009821335B2

(12) United States Patent
Burrous et al.

(10) Patent No.: US 9,821,335 B2
(45) Date of Patent: Nov. 21, 2017

(54) IRRIGATION SYSTEM

(71) Applicant: Rain Bird Corporation, Azusa, CA (US)

(72) Inventors: Robert A. Burrous, Tucson, AZ (US); James A. Elzey, American Fork, UT (US); Clint R. Haas, Tucson, AZ (US); David M. Redmond, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 56 days.

(21) Appl. No.: 14/248,087

(22) Filed: Apr. 8, 2014

(65) Prior Publication Data

US 2015/0283572 A1 Oct. 8, 2015

(51) Int. Cl.
*B05B 15/10* (2006.01)
*B05B 3/04* (2006.01)
(Continued)

(52) U.S. Cl.
CPC ............. *B05B 15/10* (2013.01); *A01G 25/00* (2013.01); *A01G 25/02* (2013.01); *A01G 25/023* (2013.01);
(Continued)

(58) Field of Classification Search
CPC ....... B05B 15/10; B05B 3/0436; B05B 12/00; B05B 3/0422; B05B 3/0418; B05B 3/044; B05B 1/02; B05B 1/14; B05B 15/00; B05B 1/20; B05B 15/061; B05B 15/063; B05B 15/062; B05B 15/069; B05B 1/3013; B05B 1/3006; B05B 3/0427; B05B 12/087; A01G 25/02; A01G 25/16; A01G 25/00; A01G 29/00; A01G 25/023; B65D 5/42; B65D 77/24; Y10S 239/15
(Continued)

(56) References Cited

U.S. PATENT DOCUMENTS 1,937,468 A    11/1933   Talbot
2,531,101 A *  11/1950   Becker ................... B05B 15/10
                                                      239/204
(Continued)

FOREIGN PATENT DOCUMENTS

JP         h05170273         7/1993

OTHER PUBLICATIONS

Lawn Belt USA Irrigation Products, Lawn Belt Sprinkler System Instructions, 1996, 4 pages.
(Continued)

*Primary Examiner* — Steven J Ganey
(74) *Attorney, Agent, or Firm* — Fitch, Even, Tabin & Flannery, LLP

(57) ABSTRACT

In accordance with one aspect, a faucet-supplied irrigation system is provided having a container, coiled tubing in the container, a plurality of pop-up sprinklers in the container, and a plurality of connectors in the container for attachment to the tubing and sprinklers. The irrigation system includes an irrigation controller in the container and a pressure regulator in the container to regulate water pressure of the supply of water to the sprinklers from the faucet. The container is configured to maintain a plurality of the coiled tubing, pop-up sprinklers, connectors, controller and regulator in a predetermined arrangement within the container.

50 Claims, 33 Drawing Sheets

(51) Int. Cl.
| | |
|---|---|
| *B05B 12/08* | (2006.01) |
| *B05B 15/06* | (2006.01) |
| *A01G 25/02* | (2006.01) |
| *A01G 25/16* | (2006.01) |
| *A01G 29/00* | (2006.01) |
| *A01G 25/00* | (2006.01) |
| *B05B 12/00* | (2006.01) |

(52) U.S. Cl.
CPC ............. *A01G 25/16* (2013.01); *A01G 29/00* (2013.01); *B05B 3/044* (2013.01); *B05B 3/0418* (2013.01); *B05B 3/0422* (2013.01); *B05B 3/0427* (2013.01); *B05B 3/0436* (2013.01); *B05B 12/00* (2013.01); *B05B 12/087* (2013.01); *B05B 15/061* (2013.01); *B05B 15/063* (2013.01)

(58) Field of Classification Search
USPC ......... 239/69, 237, 240, 242, 246, 201–207, 239/273–279, 289, 266–269, 550, 565, 239/562, 570–572, DIG. 15; 206/216, 206/223; 47/48.5
See application file for complete search history.

(56) References Cited

U.S. PATENT DOCUMENTS

| | | | | |
|---|---|---|---|---|
| 2,668,078 | A * | 2/1954 | Snoddy | B05B 15/10 239/204 |
| 2,871,057 | A | 1/1959 | George | |
| 3,096,951 | A | 7/1963 | Jenson | |
| 3,700,185 | A | 10/1972 | Hubbard | |
| 3,822,784 | A | 7/1974 | Gillemot | |
| 3,823,894 | A | 7/1974 | Frederick | |
| 3,983,997 | A | 10/1976 | Warshaw | |
| 4,451,014 | A | 5/1984 | Kitt | |
| 4,460,086 | A | 7/1984 | Davis | |
| 4,591,110 | A | 5/1986 | Wirts | |
| 4,705,657 | A | 11/1987 | Poulin | |
| 4,984,685 | A | 1/1991 | Douglas | |
| 5,103,977 | A | 4/1992 | Douglas | |
| 5,337,892 | A | 8/1994 | Zaffina | |
| 5,368,229 | A * | 11/1994 | Hayes | B05B 3/0436 239/242 |
| 5,392,901 | A | 2/1995 | Kuray | |
| 5,403,277 | A | 4/1995 | Dodge | |
| 5,421,457 | A | 6/1995 | Listenberger | |
| 5,441,163 | A | 8/1995 | Carrasco | |
| 5,456,352 | A * | 10/1995 | McQueeny | B65D 5/42 206/223 |
| 5,494,160 | A | 2/1996 | Gelmetti | |
| 5,755,057 | A | 5/1998 | Dancer | |
| 5,848,701 | A | 12/1998 | Riccabona | |
| 5,915,641 | A | 6/1999 | Barberg | |
| 6,021,974 | A | 2/2000 | Koskelainen | |
| 6,047,842 | A | 4/2000 | Feidt | |
| 6,065,693 | A * | 5/2000 | Lukas | A01G 25/02 239/266 |
| 6,430,760 | B2 | 8/2002 | Johns | |
| 6,460,287 | B1 | 10/2002 | Louie | |
| 6,648,164 | B1 | 11/2003 | DeCola | |
| 6,749,139 | B2 | 6/2004 | Speck | |
| 7,011,254 | B2 * | 3/2006 | Thornton | A01C 23/042 239/565 |
| 7,264,177 | B2 * | 9/2007 | Buck | A01C 23/042 239/69 |
| 7,293,734 | B1 | 11/2007 | Kantner | |
| 7,497,327 | B2 | 3/2009 | Martinez | |
| 8,205,749 | B2 | 6/2012 | Korpanty | |
| 9,248,952 | B2 | 2/2016 | Burrous | |
| 2004/0035748 | A1 | 2/2004 | Hernandez | |
| 2006/0124505 | A1 | 6/2006 | Hanson | |
| 2007/0029215 | A1 | 2/2007 | Martinez | |
| 2008/0155892 | A1 | 7/2008 | Katzir-Shimoni et al. | |
| 2010/0000895 | A1 | 1/2010 | Weissbrod | |
| 2010/0314483 | A1 | 12/2010 | Shah | |
| 2012/0042615 | A1 | 2/2012 | Roche | |
| 2012/0248759 | A1 | 10/2012 | Feith | |

OTHER PUBLICATIONS

Lawn Belt USA, Hidden Hose Kit, [online]. Retrieved from the Internet: <URL: http://lawnbeltusa.com/hiddenhosekit.aspx>, copyright 2013, 4 pages.
Lawn Belt USA, Save Water with Stream Rotators, [online]. Retrieved from the Internet: <URL: http://lawnbeltusa.com/lawn-sprinkler-water-saving.htm>, publicly available before Apr. 8, 2014, 2 pages.
Lawn Belt USA, Drip Irrigation System, [online]. Retrieved from the Internet: <URL: http://lawnbeltusa.com/ dripirrigationsystem-1.aspx>, copyright 2013, 4 pages.
Lawn Belt USA, Customize Water-Saver (w/MP Rotators), [online]. Retrieved from the Internet: <URL: http://lawnbeltusa.com/water-saver-kitaspx>, copyright 2013, 5 pages.
Rain Bird Corporation, Gardener's Drip Kit, Drip Irrigation System, [online]. Retrieved from the Internet: <URL: http://rainbird.com/homeowner/products/drip/GardenersDripKit.htm>, publicly available more than one year before Apr. 8, 2014, 2 pages.
Rain Bird Corporation, Landscape Dripline System, [online]. Retrieved from the Internet: <URL: http://rainbird.com/documents/diy/bro_landscapedriplinesystem.pdf>, publicly available more than one year before Apr. 8, 2014, 11 pages.
Claber, Gardenlife Catalog 2014, Colibri System, pp. 104-107 of catalog, Sep. 2013, 6 pages.
http://www.cablestogo.com/product.asp?cat_id=3540 &sku=28428, 1 page, accessed Jan. 19, 2011.
http://www.dripirrigation.com/drip_irrigation_info.php? cPath=36 &products_id=1058&osCsid=tgofusun55domlc514g222sta4, accessed Jan. 19, 2011.
http://www.licensedelectrician.com/Store/Rt/Wire_Tub.htm, 3 pages, accessed Jan. 19, 2011.
http://www.pacificcable.com/Picture_page. asp?DataName=BP0033-PTZ1000, 2 pages, accessed Jan. 19, 2011.
Maxijet, The 500 Foot Bucket, 1 page. Publicly available at least one year before Mar. 13, 2013.
Rain Bird, XQ 1/4 Distribution Tubing brochure, 2 pages. Publicly available at least one year before Mar. 13, 2013.
Picture of Lawn Belt Sprinkler System Kit, publicly available more than one year before Apr. 8, 2014, 1 page.
Lawn Belt Sprinkler System Instructions included in hit shown in cite No. 46, copyright date 1996, 4 pages.
Pictures of Rain Bird Drip Repair & Expansion Kit, publicly available more than one year before Apr. 8, 2014, 2 pages.
Troubleshooting Guide included in kit shown in cite No. 48, publicly available more than one year before Apr. 8, 2014, 8 pages.
YouTube video entitled "Colibri System," posted Apr. 11, 2013, screen captures and transcription of video, 36 pages.

\* cited by examiner

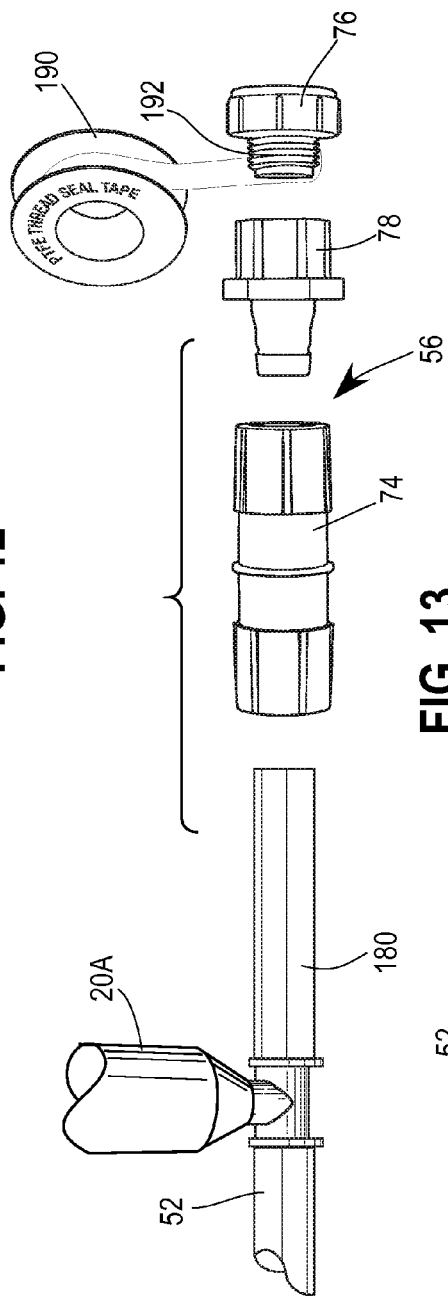
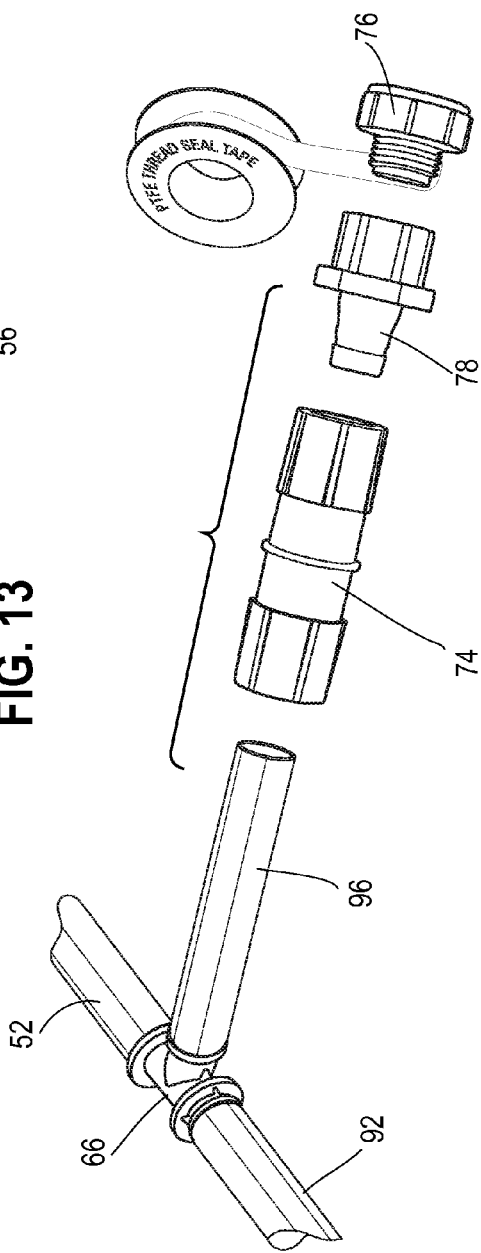
FIG. 12
FIG. 13

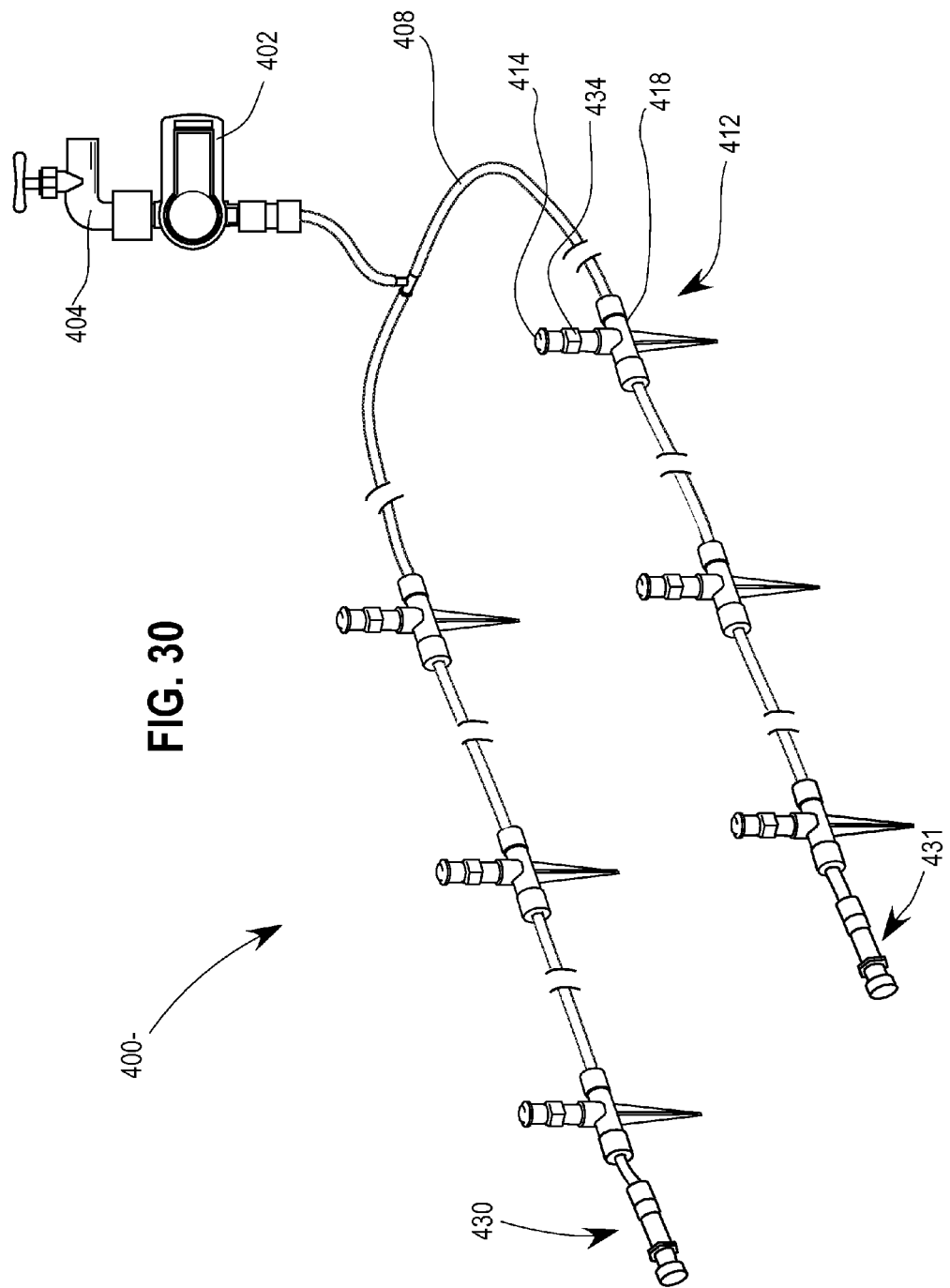

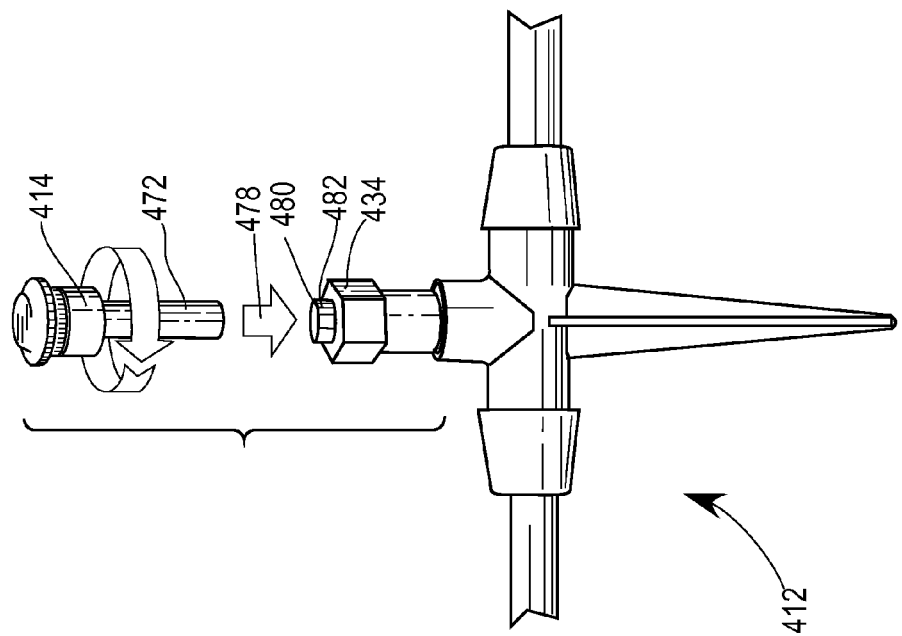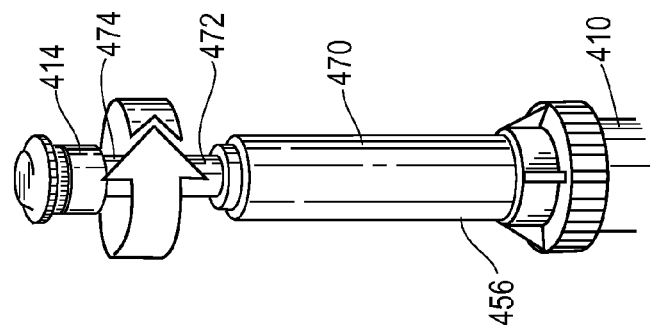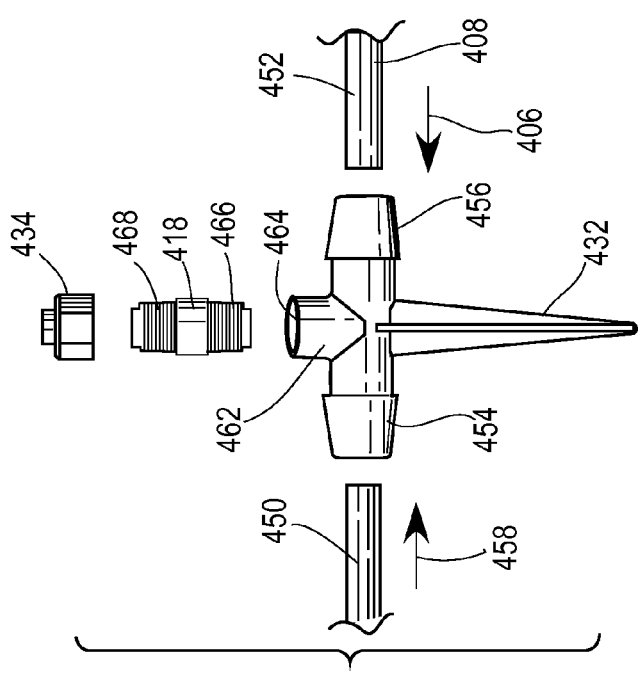

IRRIGATION SYSTEM

FIELD

The field of the invention relates to irrigation systems and, more particularly, to irrigation systems that receive fluid from a faucet.

BACKGROUND

Systems for providing irrigation to terrain are known. One type of automatic irrigation system utilizes a hose and a sprinkler connected to a faucet-mounted timer. Although the system is relatively inexpensive and easy to install, the sprinkler may need to be moved around the yard every few hours. If multiple sprinklers are connected to the timer, although the multiple sprinklers may make watering different zones easier, the presence of the sprinklers and hoses above ground may be visually unpleasing. Further, the sprinklers and the associated hoses should brought indoors during the winter months to avoid water freezing in the sprinklers and hoses.

Another type of irrigation system is a below-ground automatic sprinkler system. These systems include tubing and sprinklers buried in a consumer's yard and are typically installed by irrigation professionals. Although below-ground automatic sprinkler systems do not need to be moved about by the consumer, below-ground automatic sprinkler systems may be much more expensive than systems utilizing a sprinkler and hose connected to a faucet-mounted timer. Further, consumers desiring to build their own below-ground automatic sprinkler system may decide that it is too difficult to design the system, obtain all the parts for the system, and install the system by themselves.

BRIEF DESCRIPTION OF THE DRAWINGS

FIGS. 5-24 show a method of installing the irrigation system of FIG. 1;
FIG. 30 is a schematic view of the irrigation system of FIG. 28 with above-ground sprinklers;
FIGS. 31-33 are schematic views of a process of assembling a sprinkler of the irrigation system of FIG. 30.

DETAILED DESCRIPTION

Figure 1:
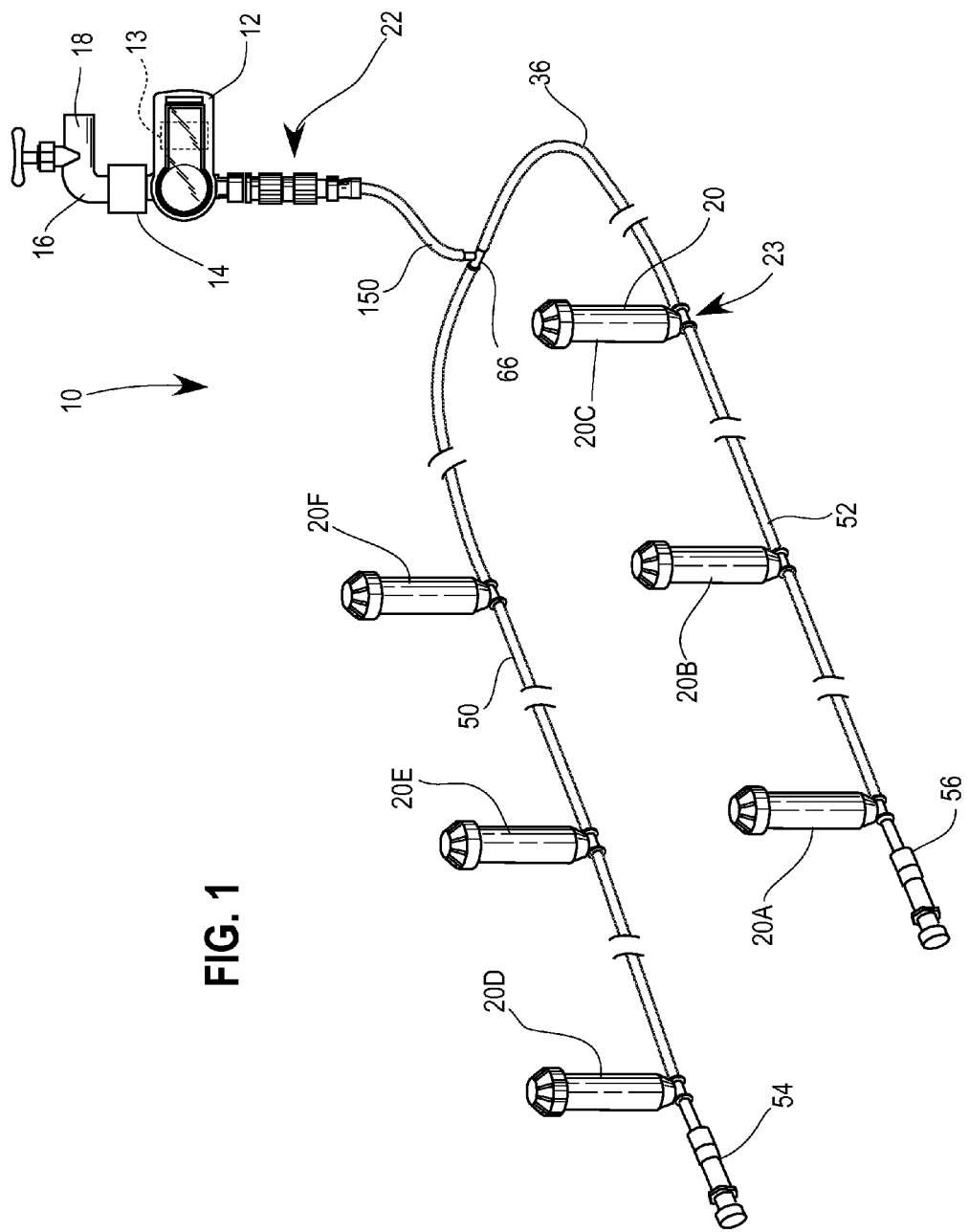
FIG. 1 is a perspective view of an irrigation system.

In accordance with one aspect, a faucet-supplied irrigation system is provided that includes a container, coiled tubing in the container, a plurality of pop-up sprinklers in the container, and a plurality of connectors in the container for attachment to the tubing and sprinklers. The irrigation system further includes an irrigation controller in the container to control a supply of water to the sprinklers and a pressure regulator in the container to regulate water pressure of the supply of water to the sprinklers. By providing the components of the irrigation system by himself in the container, a consumer does not need to design the irrigation system and then figure out what irrigation components the will need in order to build the irrigation system. Further, a consumer may obtain all of the components of the system from a single retail store by acquiring the container rather than having to go to various plumbing, landscape, and electrical departments of the retail store. The container of the system is configured to maintain a plurality of the coiled tubing, pop-up sprinklers, connectors, controller, and regulator in a predetermined arrangement within the container. This provides an organized, aesthetically pleasing presentation of the system components to a consumer in a retail environment as well as when the consumer unpacks the components after purchasing the system.

In one approach, the pressure regulator limits the water pressure supplied to the sprinklers to a maximum pressure of about sixty pounds per square inch. Preferably, the sprinklers operate in a water pressure range of approximately twenty-five pounds per square inch to approximately fifty-five pounds per square inch. This is advantageous for residential applications where the water pressure from faucet of the residence may exceed 100 pounds per square inch which can cause misting and inefficient operation of the sprinklers. The irrigation system thereby ensures efficient, mist-free operation of the sprinklers even if the consumer is unaware of the water pressure at the faucet of his home.

In accordance with another aspect, a faucet-supplied irrigation system is provided including a container, coiled tubing in the container configured to be separated into sections having end portions, and a plurality of pop-up sprinklers in the container. The system includes a plurality of connectors in the container for attachment to the tubing and sprinklers, wherein the connectors have connecting portions with barbs. The system further includes an irrigation controller having a microprocessor to control a supply of water to the sprinklers and a tool having a member configured to be inserted into the tubing end portions to prepare the tubing end portions to be advanced over the connector barbs and provide a secure attachment of the tubing end portions to the connector connecting portions. By using a tool having a member to prepare the tubing end portions to be advanced over the connector barbs, the connections between the tubing and the connectors can be sufficiently strong without the use of complicated clamp devices and specialized tubing cross sections as in some prior systems.

With reference to FIG. 1, an irrigation system 10 is provided that is easier to install and operate than some conventional irrigation systems. The irrigation system 10 includes an irrigation controller, such as a programmable timer 12, having a microprocessor 13 and a connector 14 for connecting to a faucet 16 which may be located on an exterior of a residence. The faucet 16 may include a main valve 18 which may be open and closed to control the flow of water to the timer 12. The irrigation system 10 has multiple sprinklers, such as pop-up sprinklers 20, for irrigating the surrounding terrain, flexible tubing 36 for providing water to the sprinklers 20, and connectors 23 for attaching the sprinklers 20 to the tubing 36. Once the valve 18 is turned on and the timer 12 programmed, the timer 12 permits water flow to the sprinklers 20 according to one or more preset schedules. To install the system 10, a user digs a shallow trench according to a planned layout of the system 10, places the sprinklers 20 and tubing 36 in the trench, and buries the sprinklers 20 and tubing 36 as discussed in greater detail below. The system 10 may thereby connect to an existing faucet 16 and does not require the user to install a dedicated water supply as in some conventional below-ground sprinkler systems. Further, the spray distance and spray arc of each sprinkler 20 may be adjusted by the user to customize the irrigation system 10 to the user's particular terrain. The irrigation system 10 thereby provides an easy-to-install and customizable approach for providing irrigation to terrain according to one or more preset schedules without requiring the user to periodically move the sprinklers 20 about the terrain.

Figure 3:
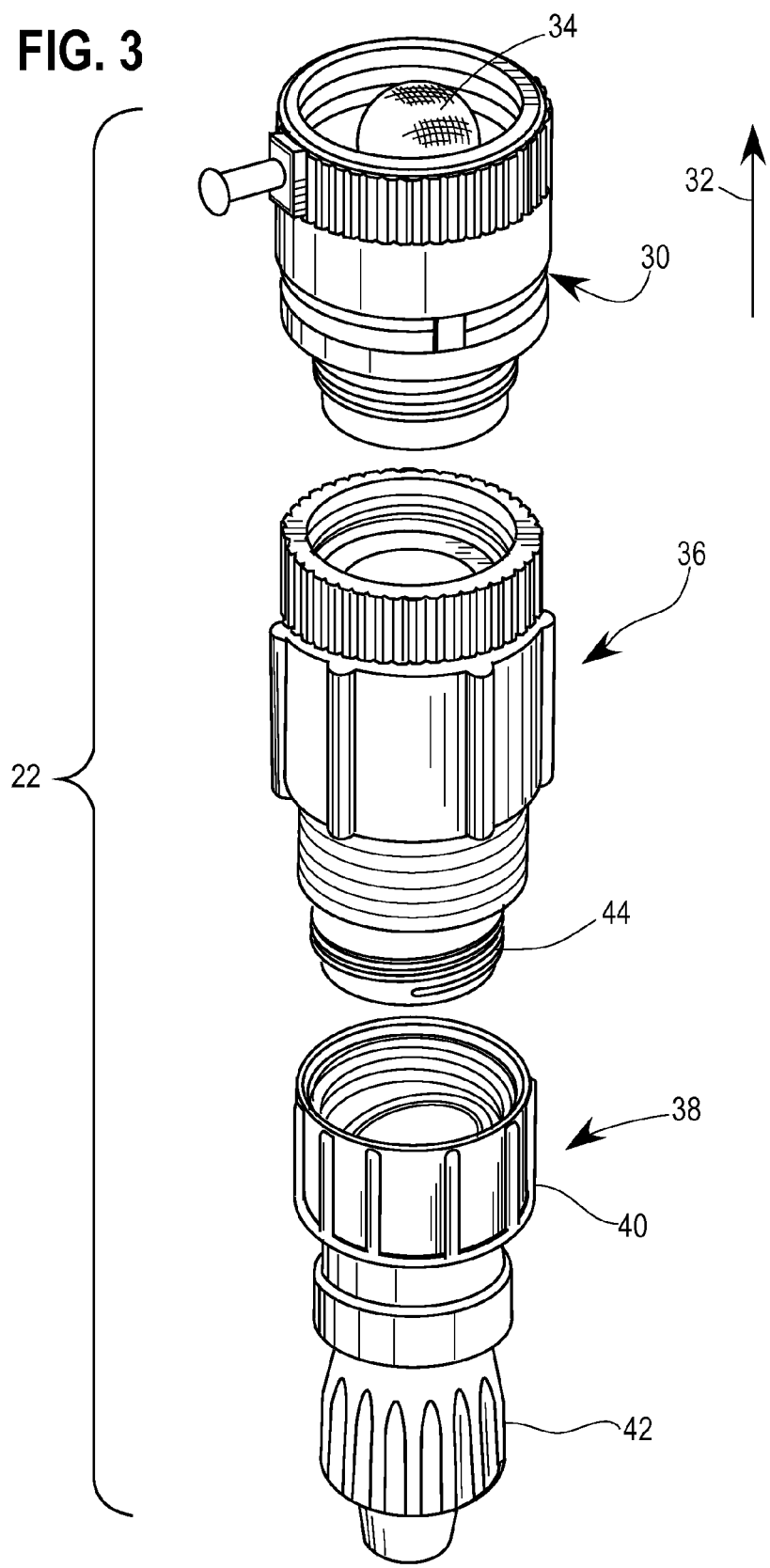
FIG. 3 is an enlarged perspective view of components of a multi-function connector of the irrigation system of FIG. 1.

The irrigation system 10 has a multi-function connector 22 downstream of the programmable timer 12. With reference to FIG. 3, the multi-function connector 22 optionally includes a backflow preventer 30 to resist the flow of water in direction 32 back into the timer 12. For example, the optional backflow preventer 30 may prevent water from flowing back into a home's water supply. The backflow preventer 30 may have a filter 34 that operates as a sediment filtration device to keep the downstream tubing 36 clear.

The multi-function connector 22 includes a pressure regulator 36 configured to regulate the pressure of the supplied water to a pressure that limits misting of the sprinklers 20. For example, the pressure regulator 36 may be configured to provide a water pressure at the sprinklers 20 in the range of approximately twenty-five pounds per square inch to approximately fifty-five pounds per square inch, preferably fifty pounds per square inch. The multifunction connector 22 also includes an adapter 38 having a threaded connector 40 and a barbed connector 42. The threaded connector 40 connects to a threaded section 44 of the pressure regulator 46 and the barbed connector 42 is configured to connect to the flexible tubing 36.

With reference to FIG. 1, the tubing 36 includes a pair of runs 50, 52 with three pop-up sprinklers 20 connected thereto and a drain valve assembly 54, 56 at the end of each run 50, 52. The drain valve assemblies 54, 56 shift to a closed configuration in response to receiving pressurized fluid. Once the pressurized fluid is no longer present in the tubing 36, the drain valve assemblies 54, 56 may shift to an open configuration that permits water to drain from the system 10. The drain valve assemblies 54, 56 are preferably installed at the lowest position on the terrain which permits gravity to drain the water from the system 10. Because the system 10 is drained of water each time the timer 12 shuts off the water flow to the tubing 36, the irrigation system 10 may remain installed throughout the year without water freezing and causing damage within the sprinklers 20 and tubing 36.

Figure 2:
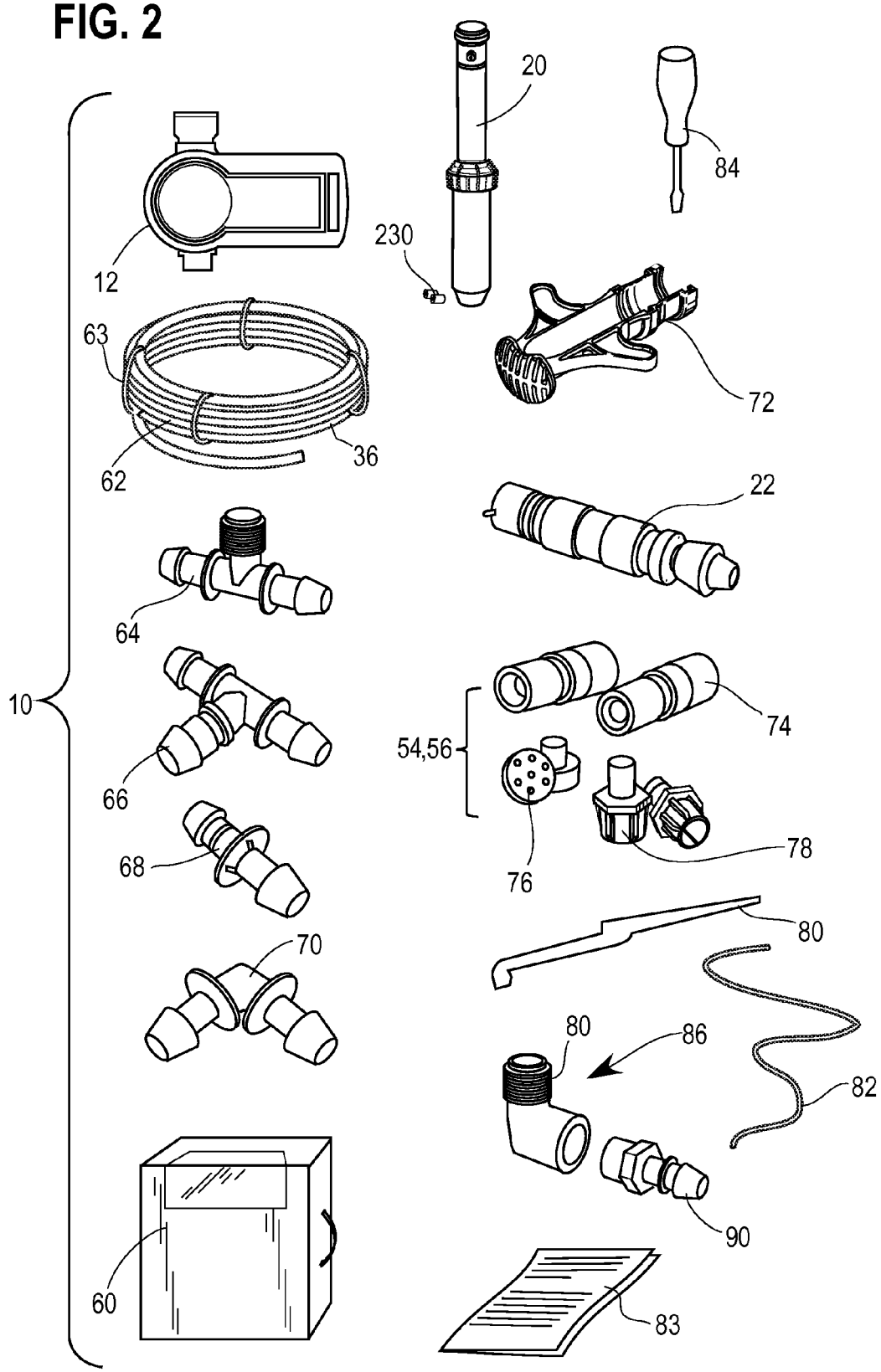
FIG. 2 is an exploded view of the irrigation system of FIG. 1.

With reference to FIG. 2, the system 10 includes a container 60 that receives the other components of the system 10. The system 10 therefore has a storage or transportation configuration where the other components of the system 10 are received within the container 60 and an installation configuration where the other components of the system 10 have been removed from the container 60. The container 60 may be easily stored and transported to a point of sale, purchased by a consumer, and transported to a consumer's residence. The system 10 thereby provides an all-in-one kit for irrigating a desired terrain without requiring the consumer to independently design the system and obtain all the components of the system. The system 10 includes a coil 62 of the tubing 36 that may be easily unwound, placed in position on the terrain to be watered, and cut to required lengths using an appropriate separating tool, as discussed in greater detail below. The tubing 36 may be made from a variety of materials appropriate for irrigation applications, such as polyethylene. The tubing 36 may be retained in the coiled configuration using straps 63. Other approaches for maintaining the coiled configuration of the tubing 36 may include shrink wrap or layers of plastic wrap material wound tightly around the coiled tubing 62.

The system 10 further includes multiple threaded and barbed tees 64 for connecting the sprinklers 20 to the tubing 36, one or more barbed tees 66 for diverting water between the sections of the tubing 36, one or more barbed couplings 68 for splicing the tubing 36, and one or more barbed elbows 70 for corners of the runs 50, 52. The system 10 further includes a barb insertion tool 72 configured to enlarge ends of the cut tubing 36 and aid in inserting barbs of the couplings 64, 66, 68, and 70 into the tubing 36, as discussed in greater detail below. The barb insertion tool 72 may be similar to the barb insertion tool disclosed in commonly owned U.S. patent application Ser. No. 13/076,173, which published as U.S. Patent App. Pub. No. 2012-0248759 on Oct. 4, 2012, the entirety of which is hereby incorporated by reference. The multi-function connector 22 is also received in the container 60 as well as the drain valve assemblies 54, 56. Each drain valve assembly 54, 56 includes a compression coupling 74, an automatic drain valve 76, and a female thread adapter 78 (which connects the automatic drain valve 76 to the compression coupling 74). The container 60 also includes stakes 80 and ties 82 for temporarily positioning the sprinklers 20 during installation. The container 60 further includes instructions 83 for installing the system 10 using the methods discussed below and a sprinkler adjustment tool, such as a screwdriver 84.

The irrigation system 10 permits a user to customize various aspects of the irrigation system 10 including the number and location of the sprinklers 20, the length and orientation of the sections of the tubing 36, and the spray distance and spray arc of the sprinklers 20. For example, a user may decide to install one sprinkler 20 on one run 50 and three sprinklers 20 on the other run 52. Alternatively, a user may decide to have only one run 50 of tubing 36 with three sprinklers 20 positioned along the run 50.

Figure 4:
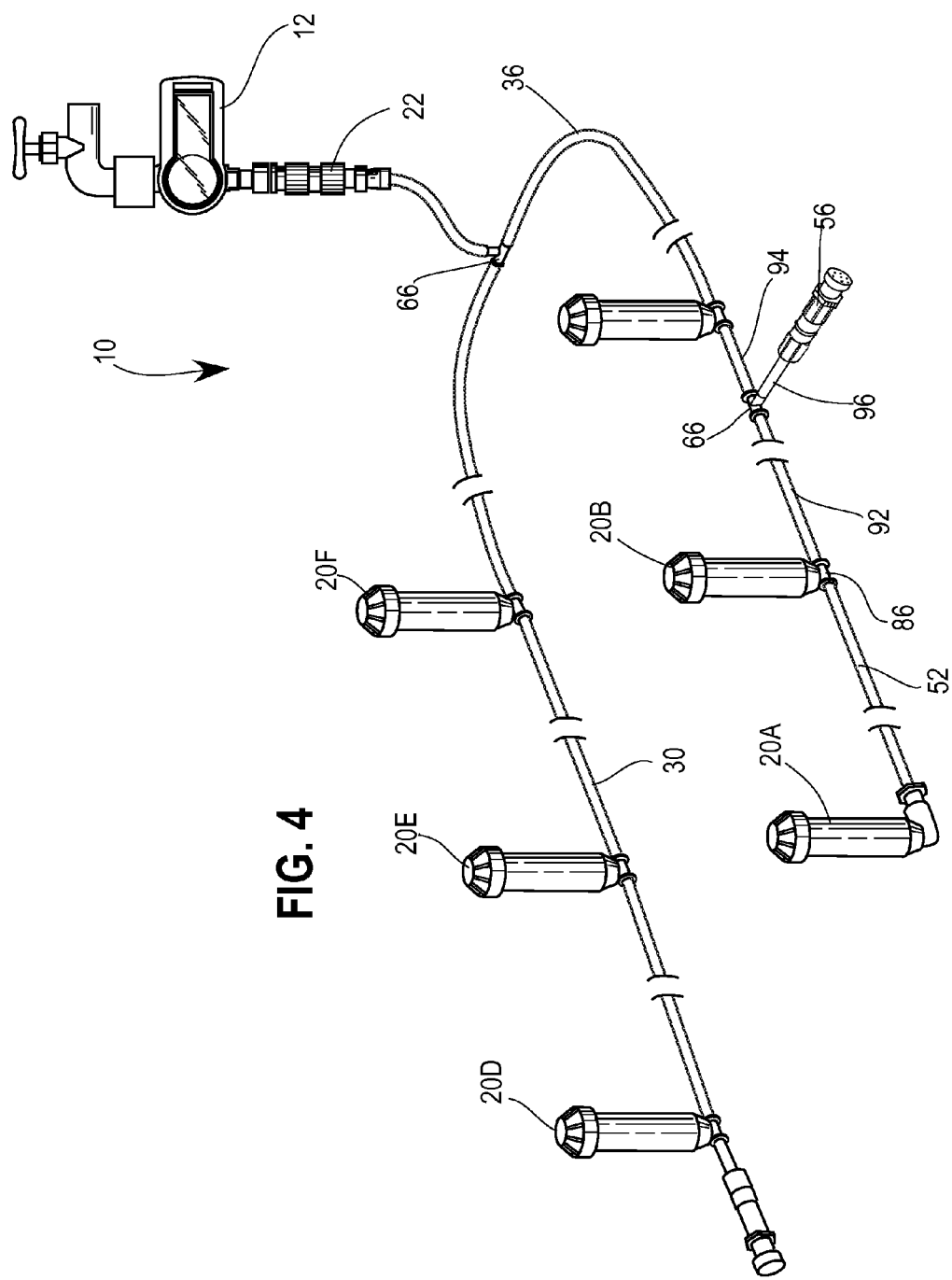
FIG. 4 is a schematic view of the irrigation of FIG. 1 with a different drain valve configuration.

As another example of the design flexibility of the irrigation system 10, one or both of the drain valve assemblies 54, 56 may be positioned at an intermediate position along the tubing runs 50,52 as shown in FIG. 4. In this approach, the user connects the sprinkler 20A to the tubing run 52 using an end run sprinkler adapter 86 (see FIG. 2) which is also received in the container 60. The drain valve assembly 56 is positioned at the intermediate location along the tubing run 52 using one of the barbed tees 66. Specifically, the tubing 36 is cut into sections 92, 94 and the tee 66 is connected to the sections 92, 94 using the barb insertion tool 72 (this process is discussed in greater detail below). A lateral section 96 is cut from the tubing coil 62 and used to connect the barbed tee 66 to the drain valve assembly 56. The irrigation system 10 thereby provides the flexibility to position the drain valve assemblies 54, 56 at any point along the tubing runs 50, 52 which is most convenient and/or has the lowest elevation.

Figure 5:
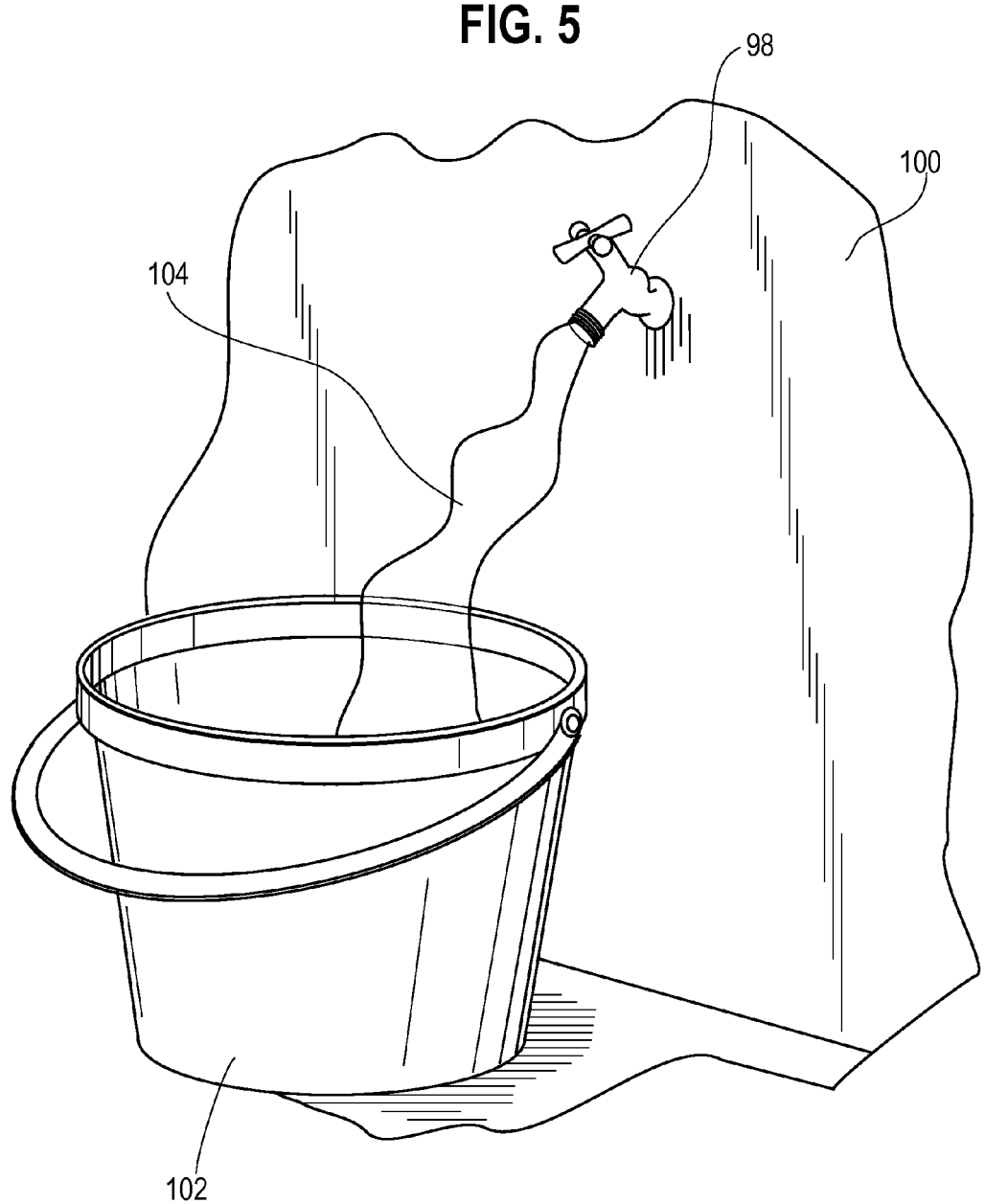

With reference to FIGS. 5-23, a method of installing the irrigation system 10 is provided that may be performed by a user without the help of an irrigation professional. Initially, the user determines the water flow rate from a faucet 98 of the user's residence 100 as shown in FIG. 5. The user may determine the flow rate of the faucet 98 by positioning a receptacle with a known volume, such as a 5-gallon pail 102, below the faucet 98 and turning on the faucet 98 until water 104 fills the pail 102. The user times the process of filling the pail 102 and the amount of time it takes to fill the pail 102 in seconds is recorded. The flow rate in gallons per minute of the faucet 98 is determined using the following formula:

(volume of receptacle (gallons)/time (seconds))×
60=gallons per minute

In one approach, the user may determine the available coverage area the irrigation system 10 is capable of providing using the following table:

| Water Flow (gpm) | Recommended maximum sprinkler throw radius (ft) | Coverage for a rectangle shaped section of terrain (ft²) | Coverage for an L-shaped section of terrain (ft²) | Maximum watering area - all sprinklers full circle spray pattern (ft²) |
|---|---|---|---|---|
| 6 | 16 | 1035 | 1280 | 3060 |
| 8 | 20 | 1568 | 2000 | 4845 |
| 10 | 24 | 2312 | 2800 | 6936 |

The user may use this table as a general guide to determine sprinkler 20 spacing (using the recommended maximum sprinkler throw radius) and maximum coverage area for the irrigation system 10. If the user requires additional spray coverage, such as for a larger area, the user may purchase one or more additional systems 10 to provide the necessary spray coverage. Each system 10 may be connected to its own faucet 98 of the residence 100. In another approach, the timer 12 may have multiple outlets for controlling water flow to sprinklers 20 in different zones. Each zone could have one or more runs of the tubing 36 and one or more sprinklers 20 along the runs of tubing 36.

Figure 6:
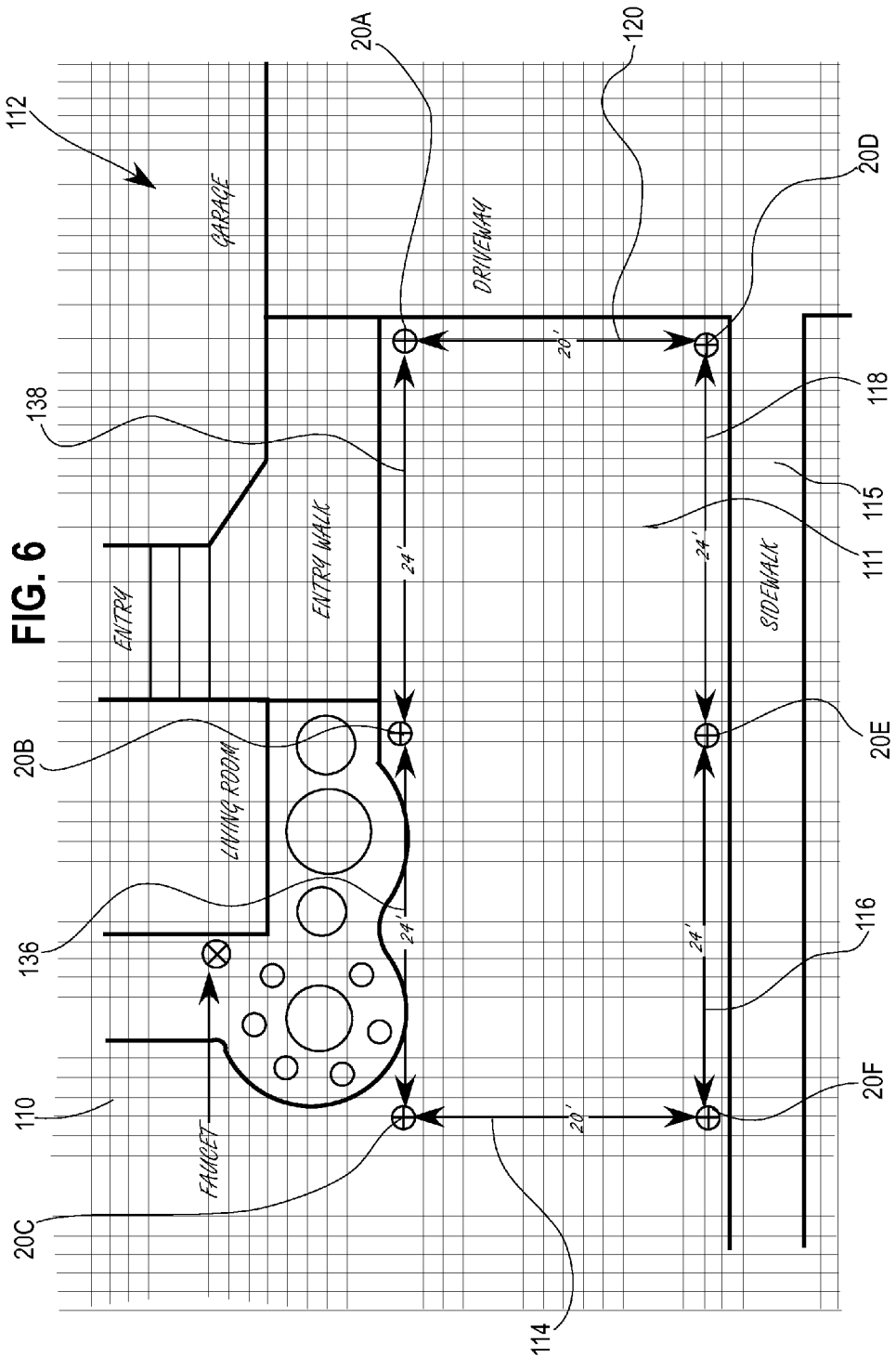

After the user has determined the maximum sprinkler throw radius using the table above, the user sketches a schematic representation 110 of the area to be irrigated, such as a section of a lawn 111, and the surrounding environment as shown in FIG. 6. The user may utilize a number of different mediums for preparing the schematic representation 110, such as paper and pencil, personal computer, tablet computer, phone, or other devices. The environment surrounding the terrain to be irrigated are shown as including a living room, entry walk, driveway, and side walk of the user's home. In one approach, the user may take one or more pictures of the terrain and/or surrounding environment and use a computer (such as a tablet computer) form the schematic representation 111 using at least a portion of the one or more pictures.

Once the area to be irrigated and the surrounding environment are incorporated into the schematic representation 110, the user draws the approximate positions of the sprinklers, 20A, 20B, 20C, 20D, 20E, 20F into the schematic representation 110. The sprinklers 20A-20F are separated by distances 114, 116, 118, 120, 136, 138 that are sized to provide overlapping coverage from the sprinklers 20A-20F while being within a predetermined throw radius of the sprinklers 20A-20F, such as in the range of approximately 16 feet to approximately 24 feet.

Figure 7:
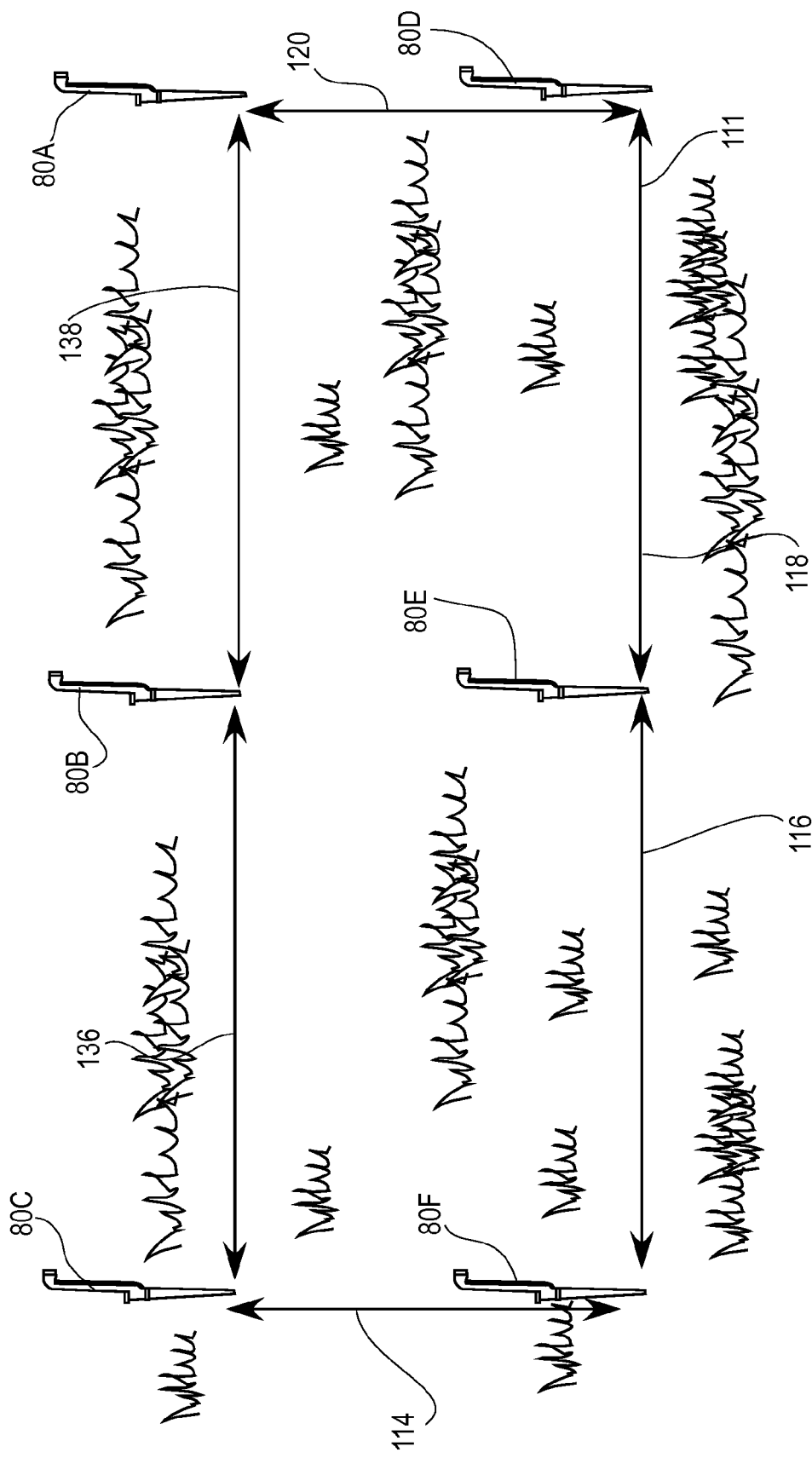

Once the user has prepared the schematic representation 110 of the area to be irrigated, including the approximate position of the sprinklers 20A-20F, the user then uses the schematic representation 110 of the irrigation system to position the stakes 80A-80F at the intended positions of the sprinklers 20A-20F as shown in FIG. 7. The distances 114, 116, 118, 120, 136, 138 are measured and compared to the intended distances 114, 116, 118, 120, 136, 138 of the schematic representation 110. The distances 114, 116, 118, 120, 136, 138 may be adjusted to provide the desired amount of spray overlap from the sprinklers 20A-20F, such as head-to-head watering.

Figure 8:
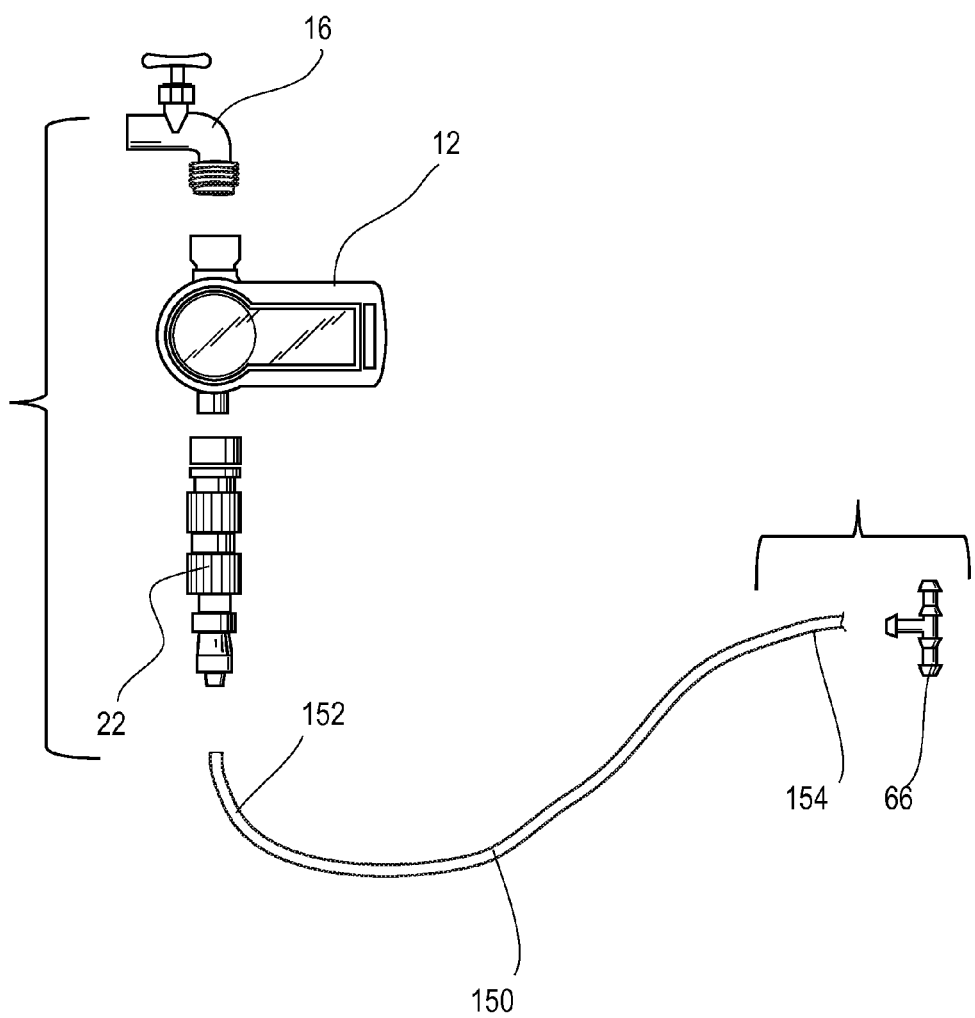

With reference to FIG. 8, the timer 12 is connected to the faucet 16 and the multi-function connector 22 is connected to the timer 12. The user then cuts a length 150 of the tubing 36 and connects one end 152 to the barbed connector 42 of the multi-function connector 22. The user connects an opposite end 154 to the barbed tee 66, which divides the water flow from the timer 12 into the separate runs 50, 52.

Figure 9:
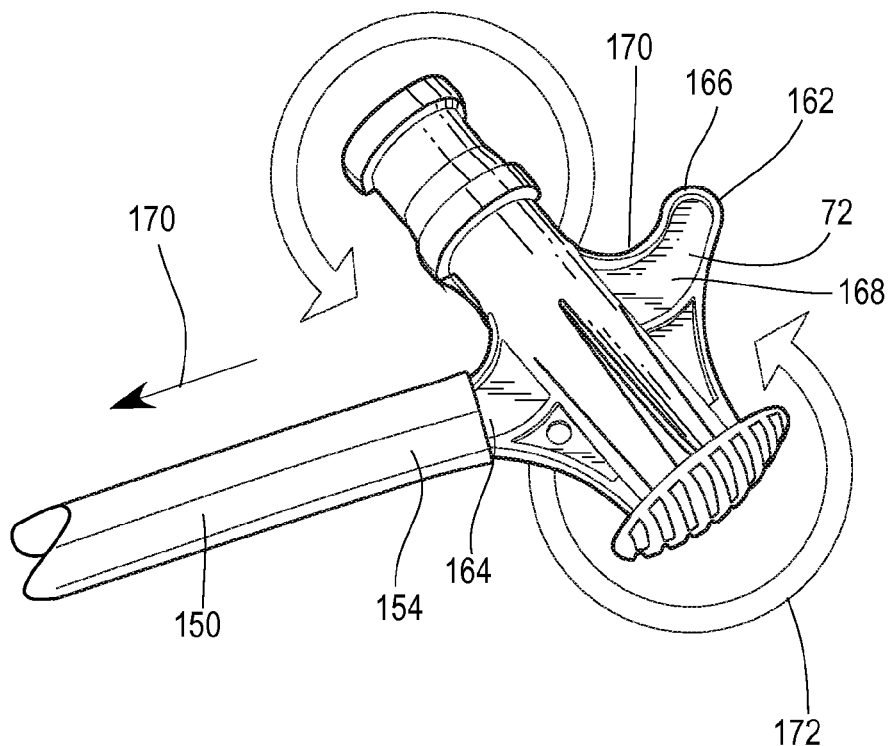
Figure 10:
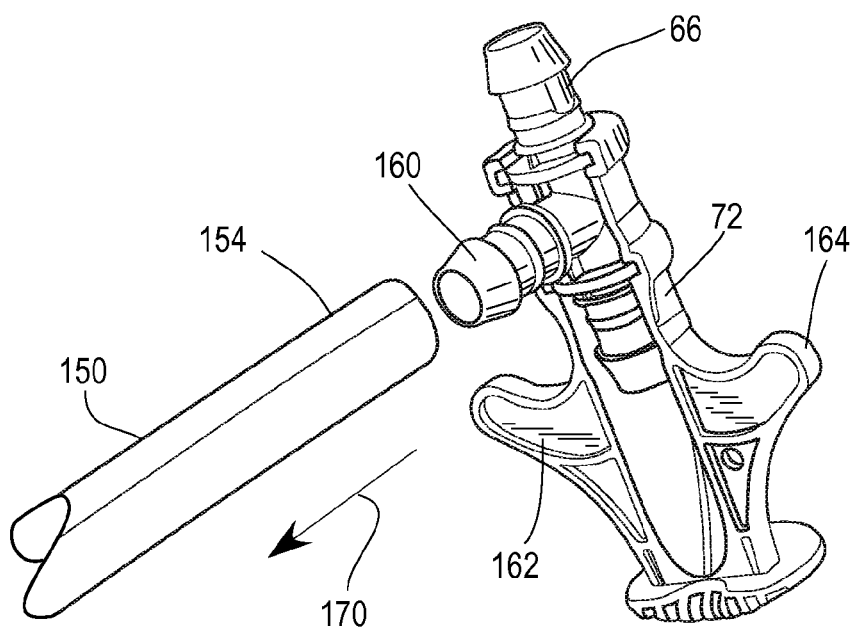

With reference to FIGS. 9 and 10, the barbed connector insertion tool 72 may be used to prepare the end 154 of the tubing section 150 to receive a barb 160 of the barbed tee 66. More specifically, the barbed connector insertion tool 72 has a pair of flaring members 162, 164 configured to be inserted partially into the inner passage of the tubing 150 and outwardly stretch the tubing 150 so that it is easier to advance the barb 160 into the inner passage of the tubing 150. The flaring members 162, 164 each include a tip 166, an outwardly tapering portion 168, and a base 170. To prepare the tubing end 154, the user inserts the flaring member 164 in direction 170 into the tubing end 154 and rocks the tool 72 side-to-side in direction 172 to flare outwardly the tubing end 154. As shown in FIG. 10, the barbed tee 66 snaps into the insertion tool 72, and the barb 160 is advanced in direction 170 into the now-flared tubing end 154.

Figure 11:
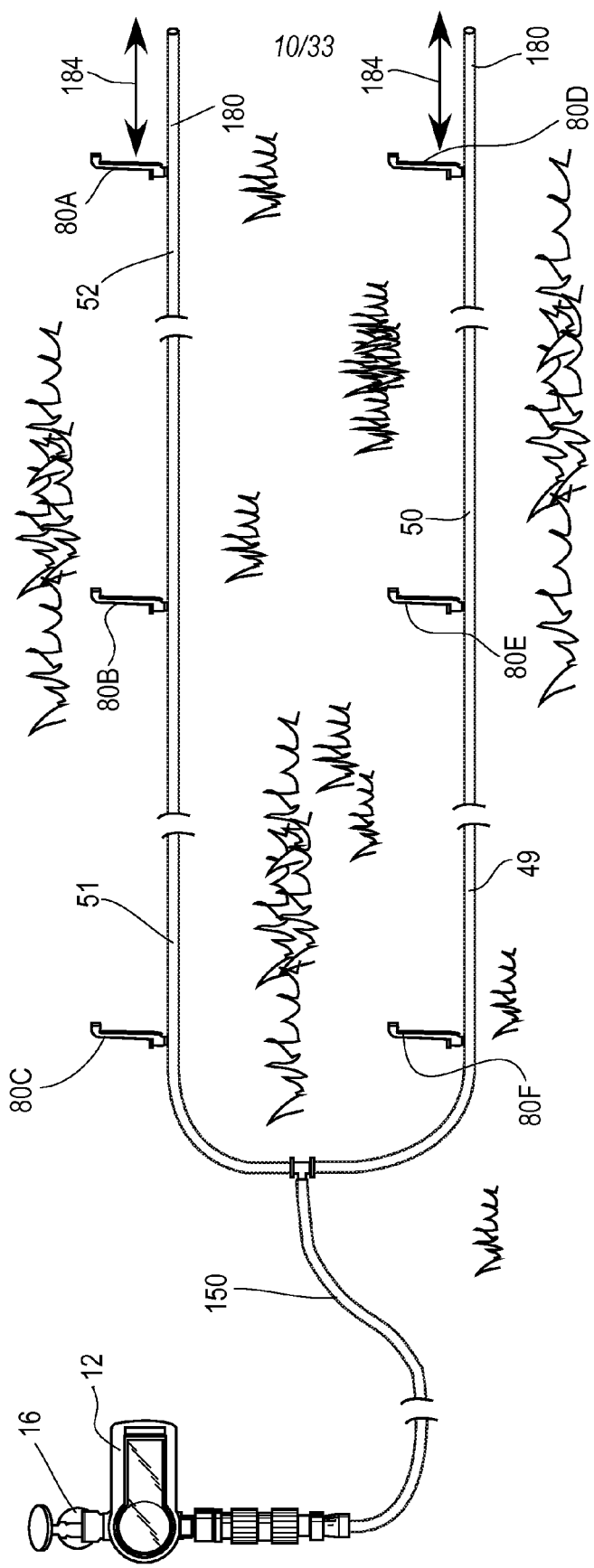

With reference to FIG. 11, the user separates lengths 49, 51 from the coiled tubing 62 to form the runs 50, 52. The lengths 49, 51 are positioned on the ground at the base of each stake 80A-80F following the schematic representation 110 of FIG. 6. The tubing runs 50, 52 include end sections 180 with lengths 184 sufficient to permit trimming and installation of the drain valve assemblies 54, 56.

With reference to FIGS. 12 and 13, the drain valve assemblies 54, 56 may be connected to either the tubing end sections 180 (FIG. 12) or the tubing lateral section 96 (FIG. 13) for the runs 50, 52. With reference to run 50 in FIG. 12, the user may apply thread seal tape 190 to threads 192 of the drain valve 76 of the drain valve assembly 56 before the drain valve 76 is connected to the adaptor 78. The adaptor 78 is connected to the compression coupling 74 which is in turn connected to the end section 180 of the run 50. Conversely, the compression coupling 74 (with adapter 78 and drain valve 76 connected thereto) may be connected to the lateral tubing section 96 using the approach described above with respect to FIG. 4. This process is repeated with the run 52 and the drain valve assembly 54.

Figure 14:
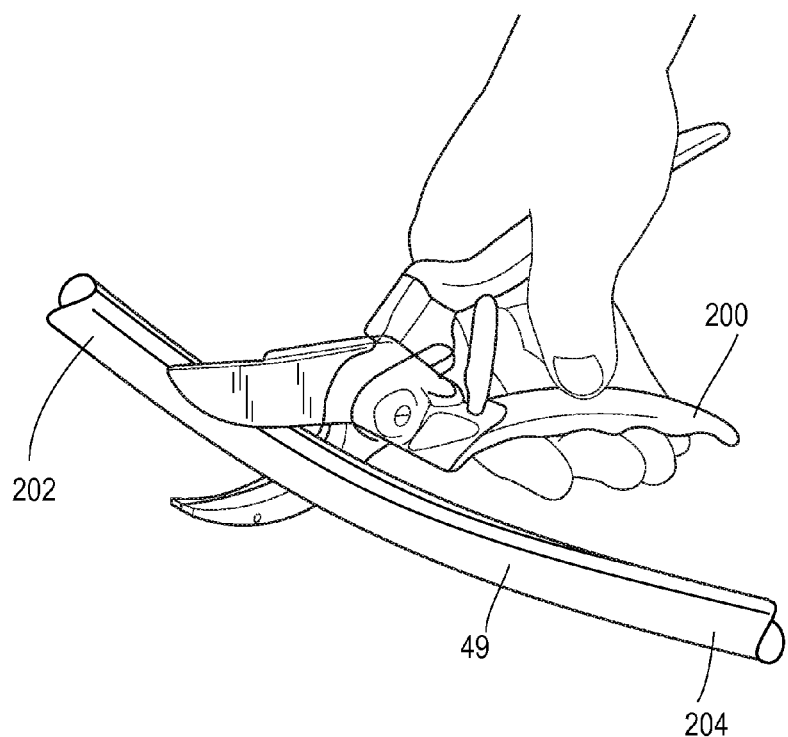
Figure 15:
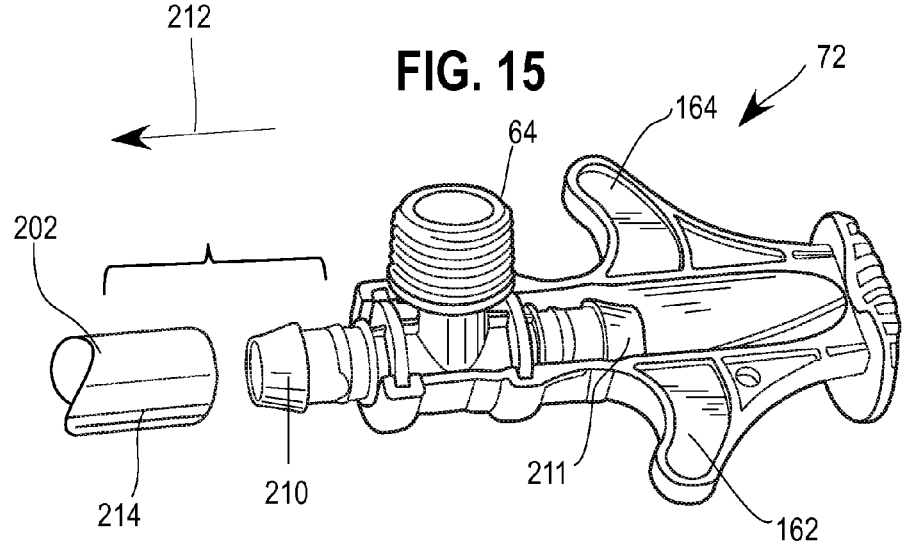
Figure 16:
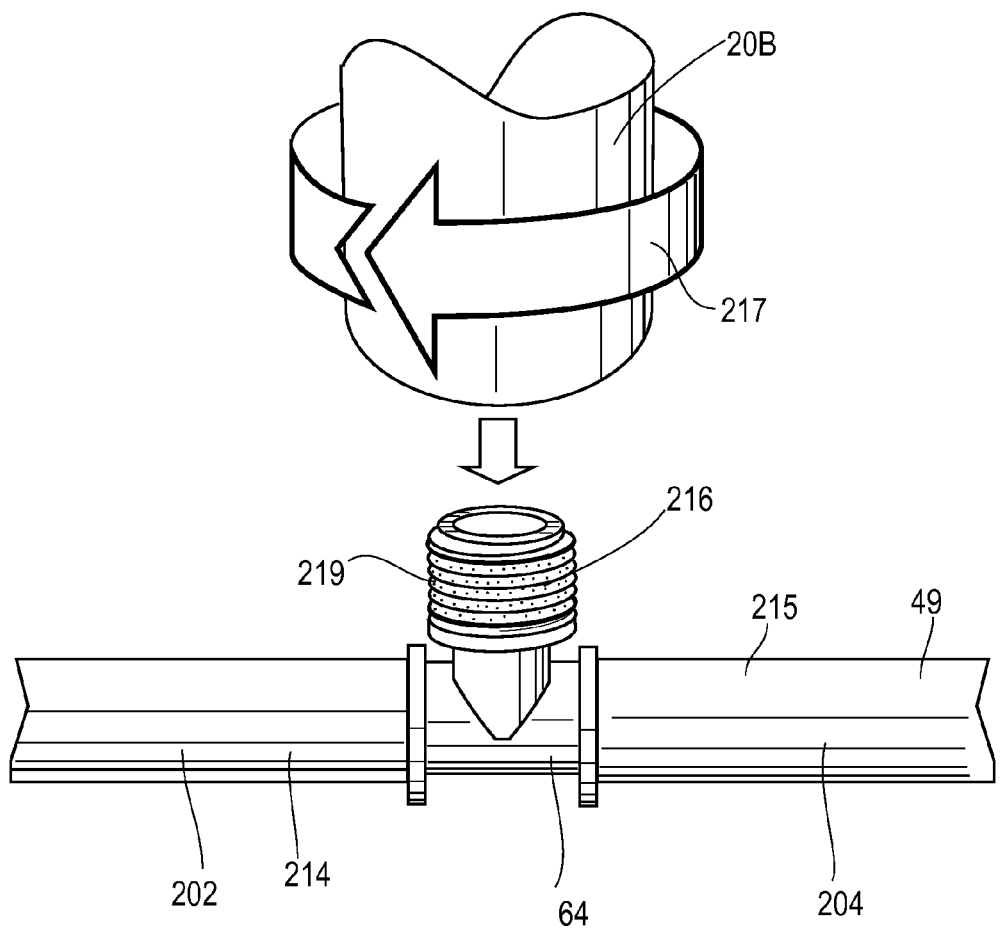

With reference to FIGS. 11 and 14, the lengths of tubing 49, 51 are separated at the location of each sprinkler 20, as represented by the stakes 80A-80E, before connecting the sprinklers 20 to the tubing 49, 51 using the threaded and barbed tees 64. For example, the user connects the sprinkler 20B (see FIG. 1) to the tubing 49 by first cutting the tubing 49 into sections 202, 204 using a tubing separation tool 200 (see FIG. 11), as shown in FIG. 14. Next, the insertion tool 72 is used to advance a barb 210 of the threaded and barbed tee 64 in direction 212 into an end 214 of the section 202. Preferably, one of the flaring members 162, 164 of the insertion tool 72 is used to flare the tubing end 214 prior to advancing the tee barb 210 into the end 214 (as discussed above with respect to FIGS. 9 and 10). With the barb 210 of the threaded and barbed tee 64 inserted into the tubing section 202, the user presses an opposite barb 211 (see FIG. 15) of the threaded and barbed tee 64 into an end 215 of the tubing section 204, as shown in FIG. 16. Like the tubing end 214, the user may prepare the tubing end 215 using the insertion tool 72 before advancing the barb 211 into the tubing end 215. This process is repeated until the user has connected a threaded and barbed tee 64 to the tubing 49, 51 at the location of each stake 80A-80E.

With reference to FIG. 16, the user connects the sprinklers 20A-20F to the threaded and barbed tees 64 at the locations of the stakes 80A-80E. For example, the sprinkler 20B may have a threaded female connection portion that engages a threaded male connection portion 216 of the threaded and barbed tee 64 by turning the sprinkler 20B in direction 217. Optionally, thread tape 219 may be applied to the threaded male connection portion 216 before connecting the sprinkler 20B.

Figure 17:
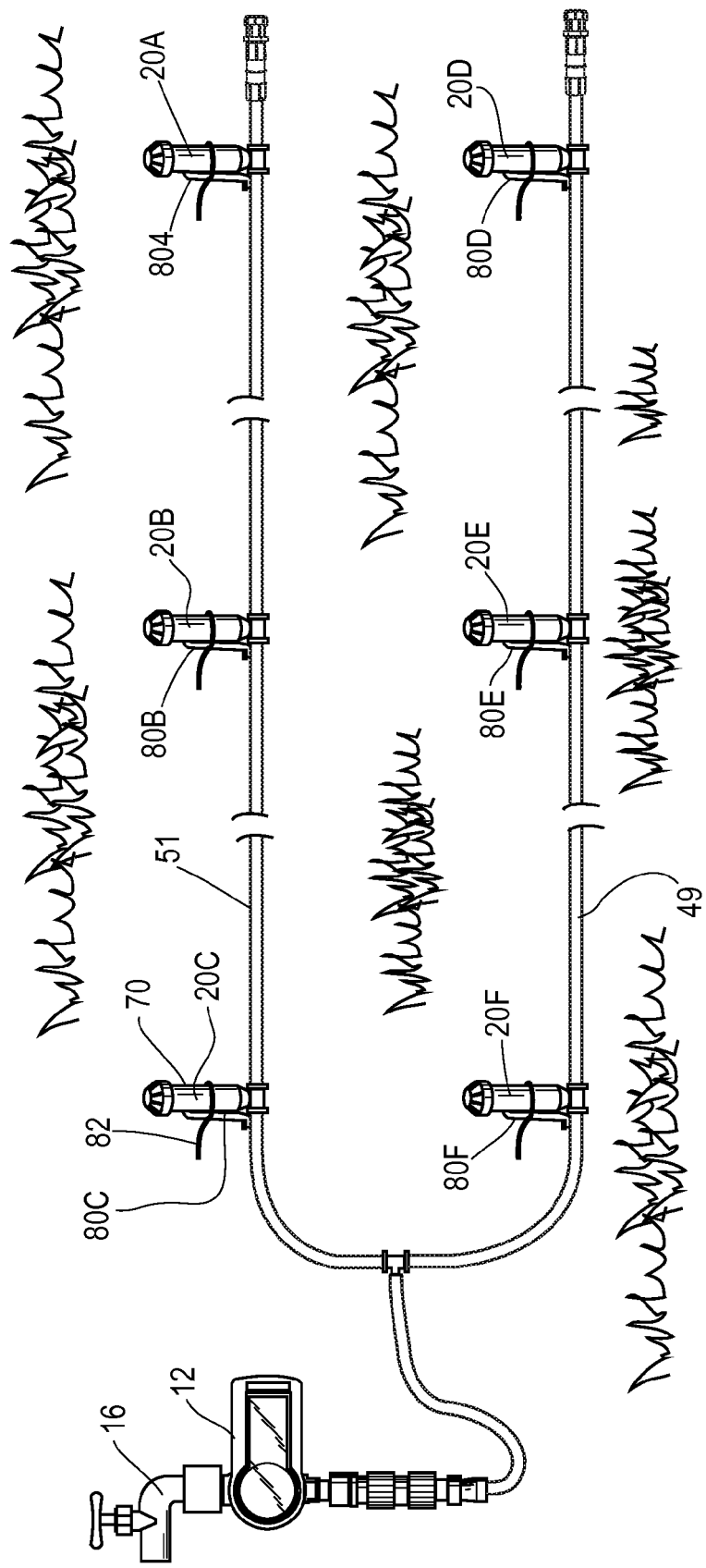
Figure 18:
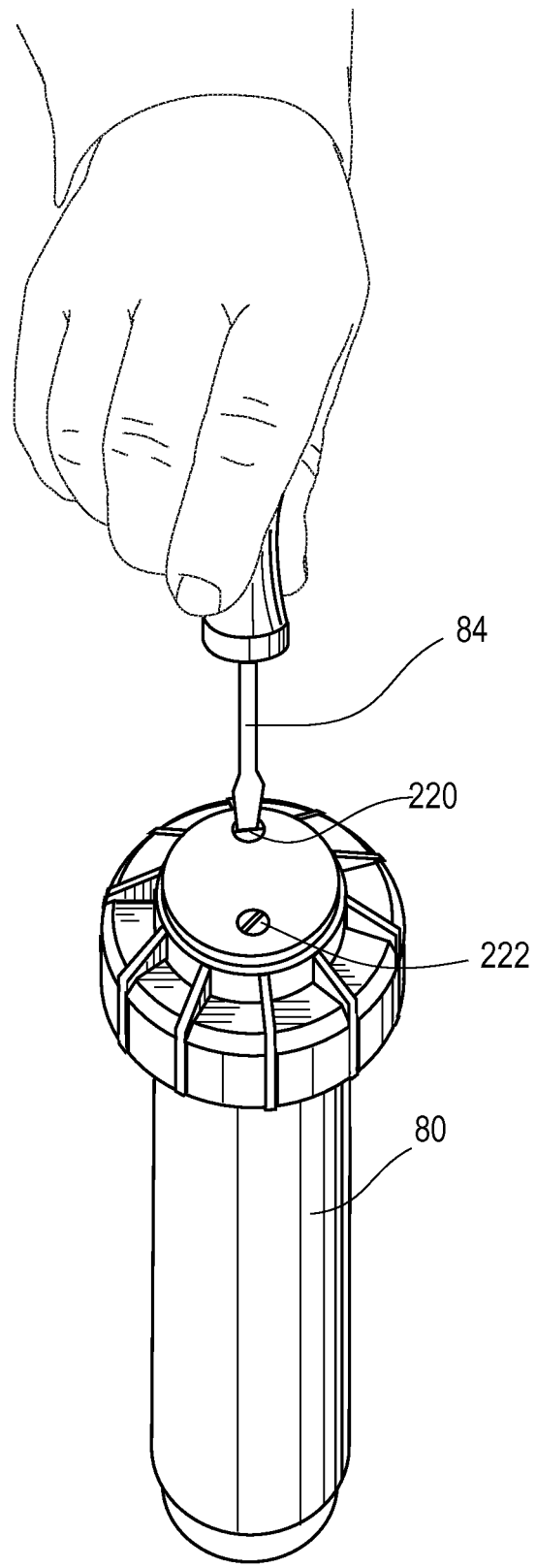

With reference to FIG. 17, the user temporarily connects the sprinklers 20A-20F to the stakes 80A-80F using the ties 82. The faucet 16 is turned on and the timer 12 is placed in a test mode which permits fluid to flow through the timer 12 and to the sprinklers 20. The user observes the throw distance and pattern of each of the sprinklers 20 and confirms that the spray coverage of the sprinklers 20 sufficiently covers the lawn 111.

As the sprinklers 20 water the lawn 111, the user may observe gaps or overspray from the sprinklers 20. For example, the user may observe that the sprinklers 20A-20C (see FIG. 17) have an insufficient amount of spray overlap due to the spacing between the sprinklers 20 and that the sprinklers 20D-20F initially have a 360 degree spray arc which causes the sprinklers 20D-20F to spray onto a sidewalk 115 (see FIG. 6). The user may address the under-spray of the sprinklers 20A-20C by using the screw driver 84 to adjust a throw distance input of the sprinklers 20A-20C, such as the distance screw 220 (see FIG. 18), to increase the throw distance of the sprinklers 20A-20C. The increased throw distance will cause a larger amount of spray overlap between the sprinklers 20A-20C. Similarly, the user may address the over-spray of the sprinklers 20D-20F by using the screw driver 84 to adjust an arc adjustment input of the sprinklers 20D-20F, such as arc screw 222, to decrease the spray arc of the sprinklers 20D-20F. By turning the arc screw 222 clockwise or counterclockwise, the watering arc may be adjusted within a predetermined range, such as to a spray arc of approximately 40 degrees to a spray arc of approximately 360 degrees. The user may thereby the turn arc screw 222 on the sprinklers 20D-20F to set the spray arc of the sprinkler 20D to be ninety degrees, the sprinkler 20E to be one-hundred eighty degrees, and the sprinkler 20F to be ninety degrees, for example. In this manner, the distance screw 220 and the arc screw 222 permit the user to narrowly tailor the operation of each sprinkler 20 to the planned positioning and spray as set forth in the schematic representation 110.

Figure 19:
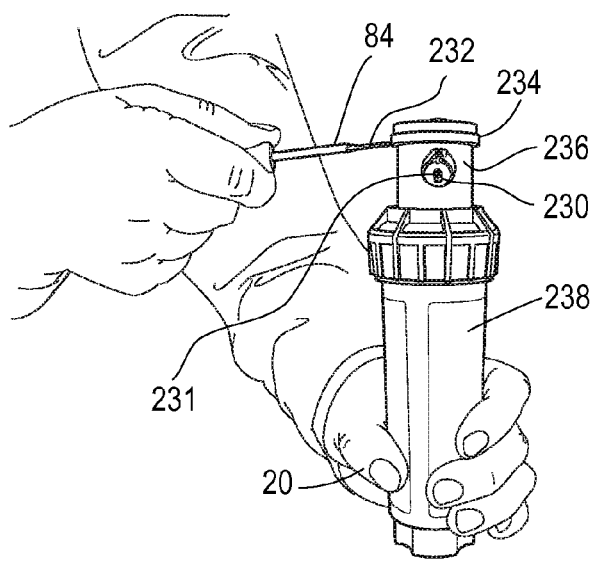
Figure 20:
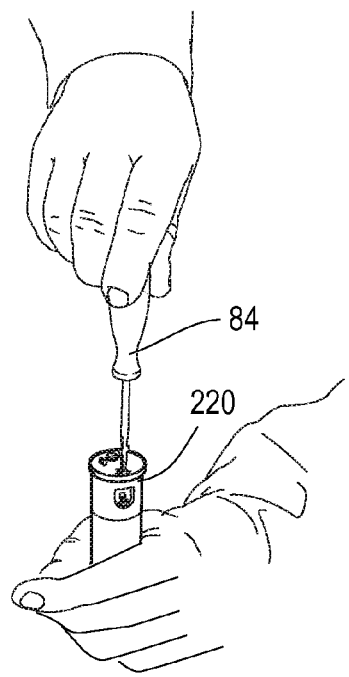
Figure 21:
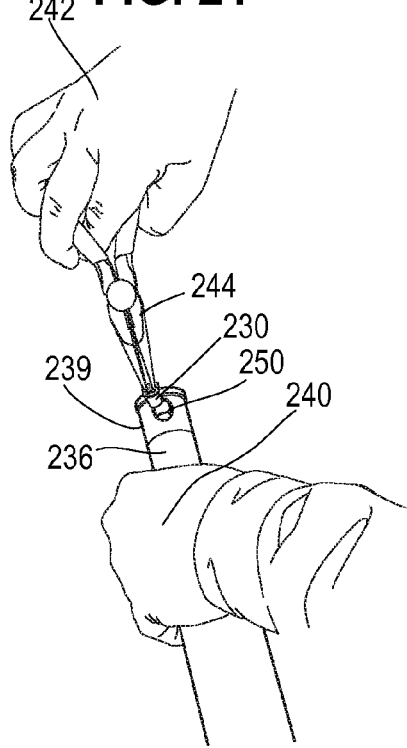

With reference to FIG. 2, the system 10 may include a plurality of nozzles 230 for use with each sprinkler 20 so that a user may select a particular nozzle 230 in order to achieve a desired performance out of each sprinkler 20. Turning to FIGS. 19-21, the sprinklers 20 may come preassembled with low flow nozzles 230, such as 0.75 gallon per hour nozzles, and include higher flow rates such as 1.0 gallon per hour nozzles and 1.5 gallon per hour nozzles. The nozzles 230 may have ports 231 sized to produce different flow rates for the different nozzles 230. If the flow rate from the faucet 16 is sufficient, the throw distance of the sprinklers 20 may be increased by changing the nozzles 230 of one or more sprinklers 20 to a higher flow rate nozzle 230.

With reference to FIG. 19, the user engages a tip 232 of the screw driver 84 with an underside of a cap 234 of the sprinkler 20 and pulls upwardly on the screw driver 84. This draws a riser 236 of the sprinkler 20 outward from a body 238 of the sprinkler 20. As shown in FIG. 21, the user grasps the riser 236 with one hand 240 and uses another hand 242 to manipulate pliers 244 and remove the nozzle 230 from a rotor 239 of the sprinkler riser 236. Before releasing the nozzle 230 from the rotor 239, the distance screw 220 may need to be loosened. The desired nozzle 230 may then be positioned in a socket 250 of the rotor 239 which held the previous nozzle 230. The user may then lock the current nozzle 230 in the socket 250 by tightening the distance screw 220. Once the user has customized the sprinklers 20 and confirmed that they operate according to the schematic representation 110, the user may disconnect the sprinklers 20 from the stakes 80 and proceed to bury the tubing 36 and sprinklers 20.

Figure 22:
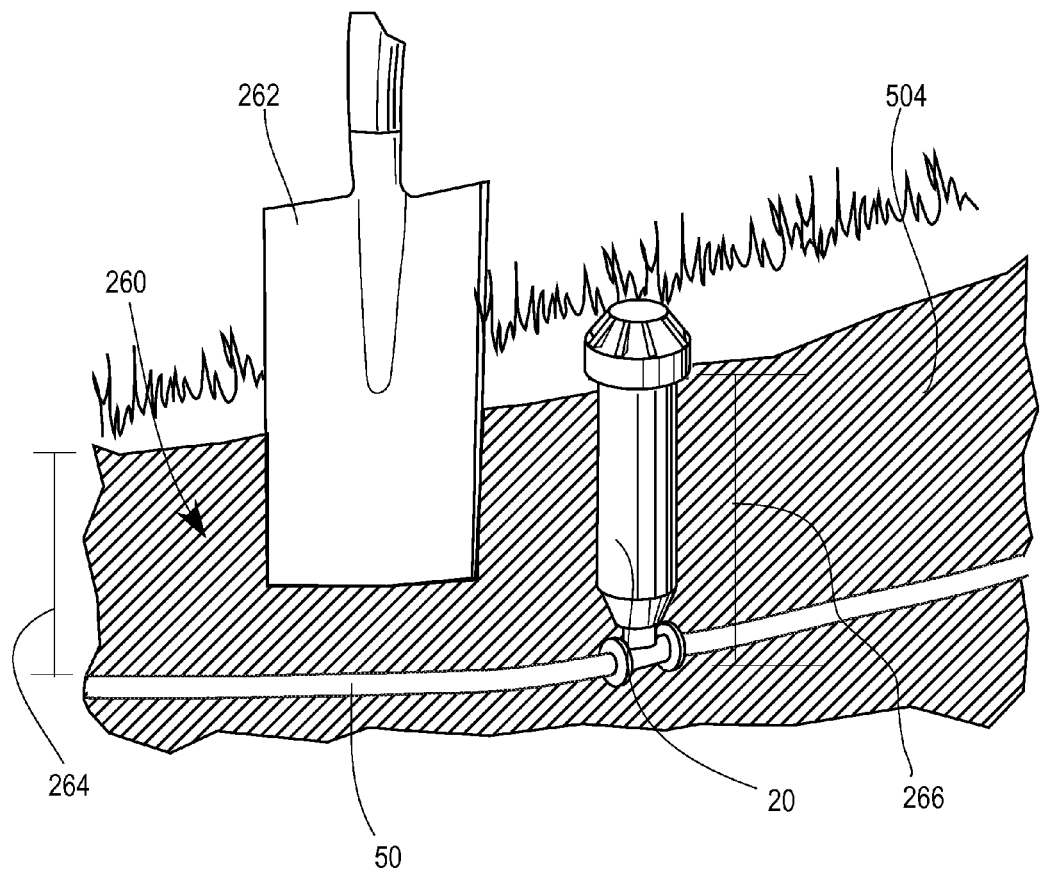

With reference to FIGS. 1 and 22, the user digs a shallow trench 260 for components of the system 10 using a flat blade shovel 262 in short intervals. The trench 260 has a depth that varies along the trench 260, including a tubing depth 264 which may be approximately four inches and a sprinkler depth 266 about the sprinklers 20 that may be slightly deeper, such as six inches. After digging the trench 260, the user pushes the tubing runs 50, 52, sprinklers 20 thereon, drain valve assemblies 54, 56 connected thereto, barbed connector 66 joining the tubing runs 50, 52, and a portion of the tubing section 150 (if desired) into the trench 260 using his hands. The user then buries the components of the system 10 within the trench 260.

Figure 23:
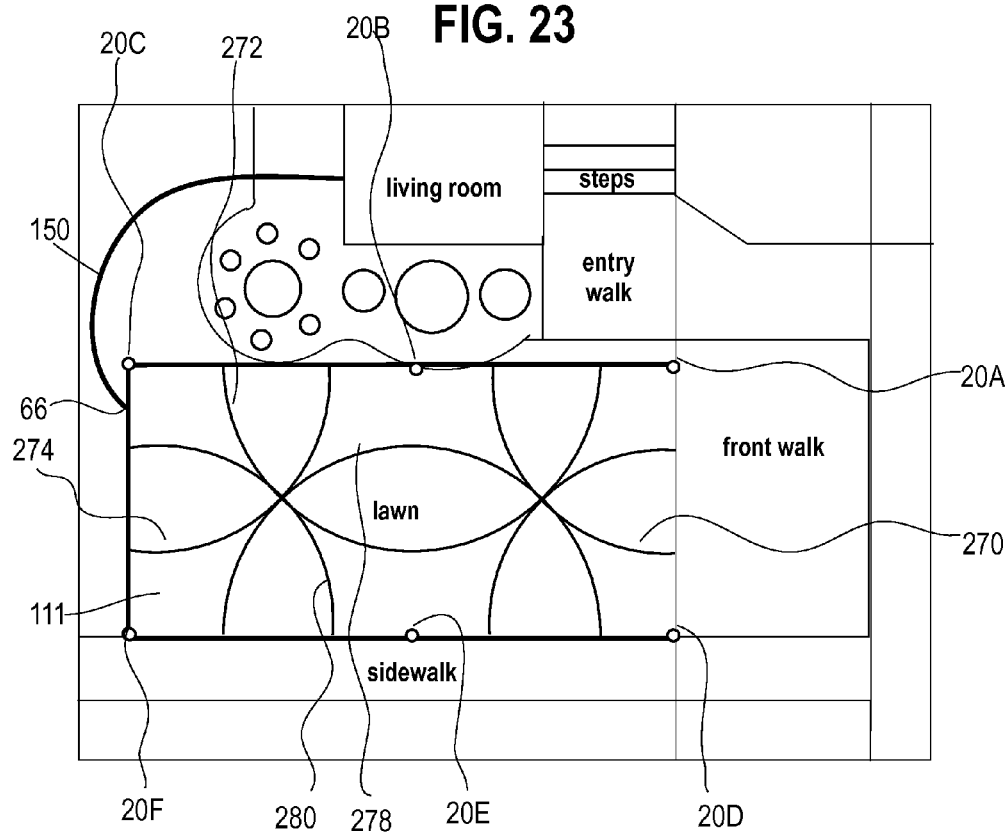

With reference to FIG. 23, a schematic view of the installed sprinkler system 10 is shown to illustrate the coverage provided by the sprinklers 20A-20F. As shown, the sprinkler 20A has a throw pattern 270 of approximately 90 degrees, sprinkler 20B has a spray pattern 272 of approximately 180 degrees, sprinkler 20C has a throw pattern 274 of approximately 90 degrees, sprinkler 20D has a throw pattern 276 of approximately 90 degrees, sprinkler 20E has a throw pattern 278 of approximately 180 degrees, and sprinkler 20F has a throw pattern 280 of approximately 90 degrees. The throw distances and throw arcs of each sprinkler 20 may be adjusted as discussed above with respect to FIGS. 18-21 to provide the desired spray coverage of the lawn 111. As shown in FIG. 23, the spray patterns of the sprinklers 20A-20F overlap to ensure that the entire lawn 111 receives adequate watering.

The irrigation system 10 is now ready to use. One or more watering schedules may programmed into the timer 12 such that the sprinklers 20 will operate to periodically irrigate the lawn 111. Because the runs 50, 52 include the drain valve assemblies 54, 56, the system 10 may be remain buried in the lawn 111 year-round. Thus, not only does the system 10 permit irrigation of the lawn 111 with reduced user involvement, the system 10 does not need to be removed from the lawn 111 during colder seasons.

Figure 24:
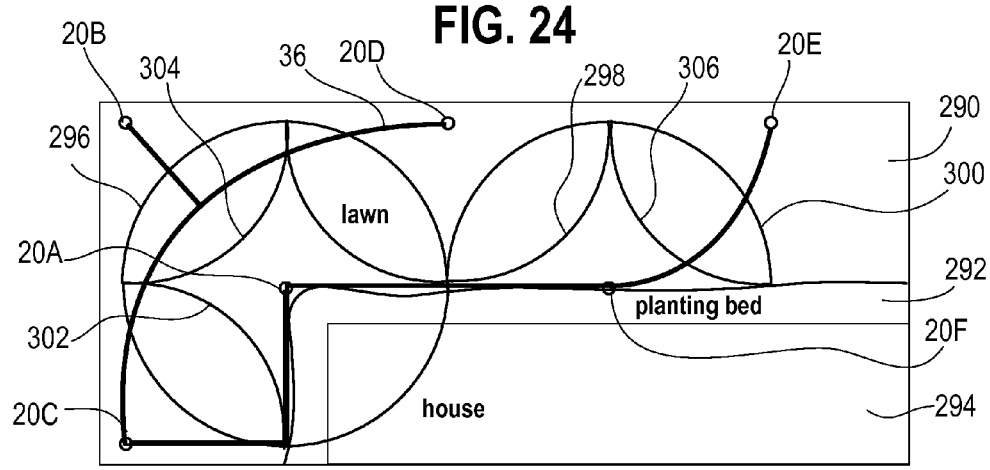

With reference to FIG. 24, another configuration of the irrigation system 10 is shown for watering an L-shaped lawn 290 next to a planting bed 292 of a house 294. It will be appreciated that the tubing 36 may need to be cut to different lengths and different connectors 23 may be used to configure the sprinkler system 10 for use with the L-shaped lawn 290. For example, one or more barbed elbows 70 (see FIG. 2) may be used to connect runs of the tubing 36 at ninety degrees to each other. Once the system 10 has been installed to irrigate the L-shaped lawn 290, the sprinkler 20A has a spray pattern 296 of approximately 360 degrees, the sprinklers 20D and 20F have respective spray patterns 298, 300 of approximately 180 degrees, and the sprinklers 20B, 20C, and 20E have respective throw patterns 304, 302, and 306 of approximately ninety degrees.

Figure 25:
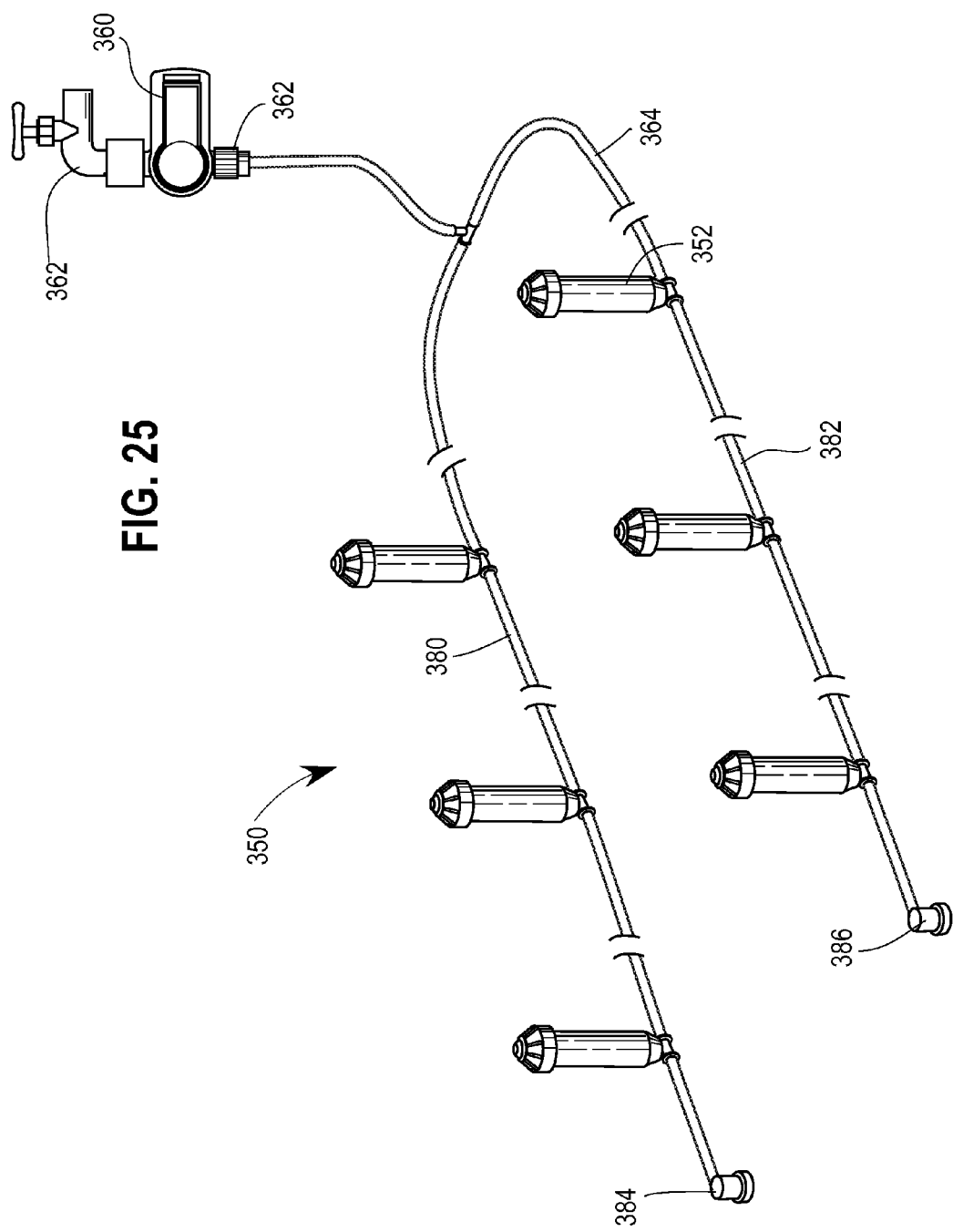
FIG. 25 is a schematic view of another irrigation system.
Figure 26:
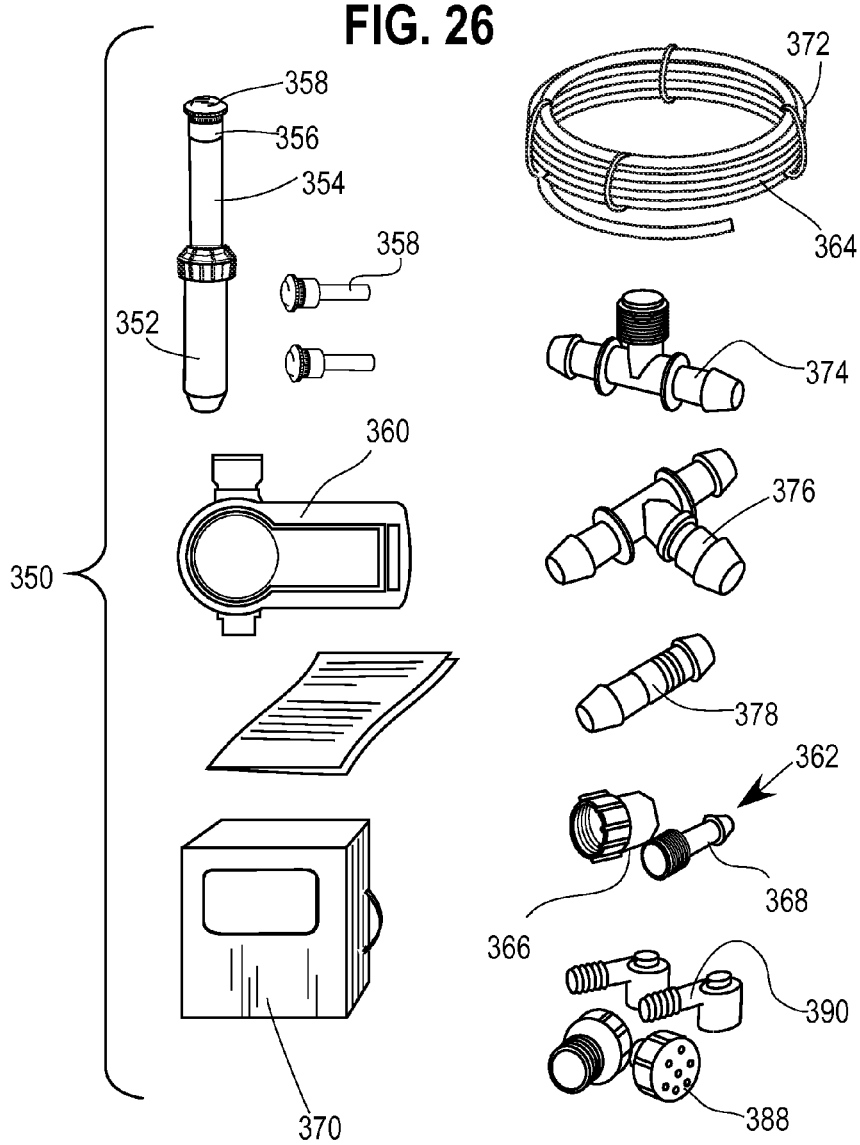
FIG. 26 is an exploded view of the irrigation system of FIG. 25.

With respect to FIGS. 25 and 26, another irrigation system 350 is provided that has similar components as the irrigation system 10 discussed above and is installed in a similar manner such that differences between the system 10 and the irrigation system 350 will be highlighted. The irrigation system 350 includes sprinklers 352, such as pop-up sprinklers having risers 354 that support heads 356 with removable rotary nozzles 358. The irrigation system 350 has a timer 360 for connecting to a faucet 361 and a distribution tubing connector 362 for connecting tubing 364 to the timer 360. The distribution connector 362 includes a female fitting 366 for connecting to the timer 360 and a male barbed fitting 368 for engaging the tubing 364. The irrigation system 350 further includes threaded and barbed tees 374, barbed tees 376, and barbed couplings 378, as shown in FIG. 26. The irrigation system 350 includes a container 370 that receives the other components of the irrigation system 350, including a coil 372 of the tubing 364, when the irrigation system 350 is in a transport or storage configuration thereof.

Figure 27:
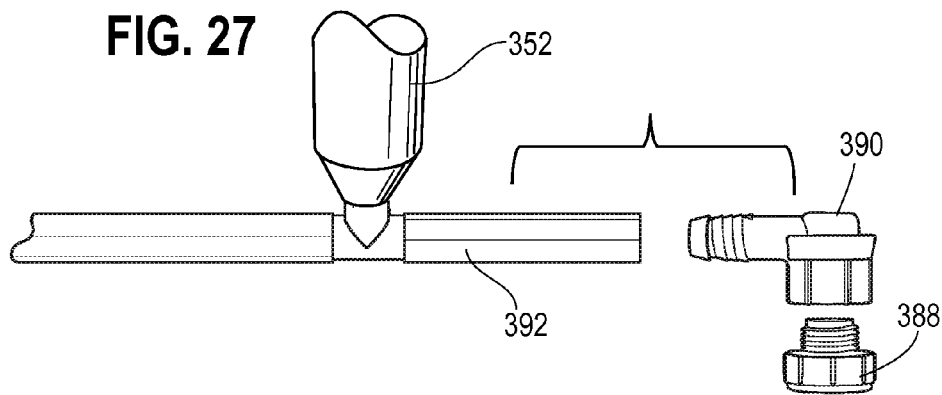
FIG. 27 is an enlarged schematic view of a portion of the irrigation system of FIG. 25.

With reference to FIG. 25, the irrigation system 350 includes two runs 380, 382 of the tubing 364 each having a drain assembly 384, 386 at the end thereof. The drain valve assemblies 384, 386 each have an automatic drain valve 388 (see FIG. 26) and a female pipe threaded adaptor 390 for connecting the automatic drain valve 388 to an end section 392 of each run 380, 382, as shown in FIG. 27.

Figure 28:
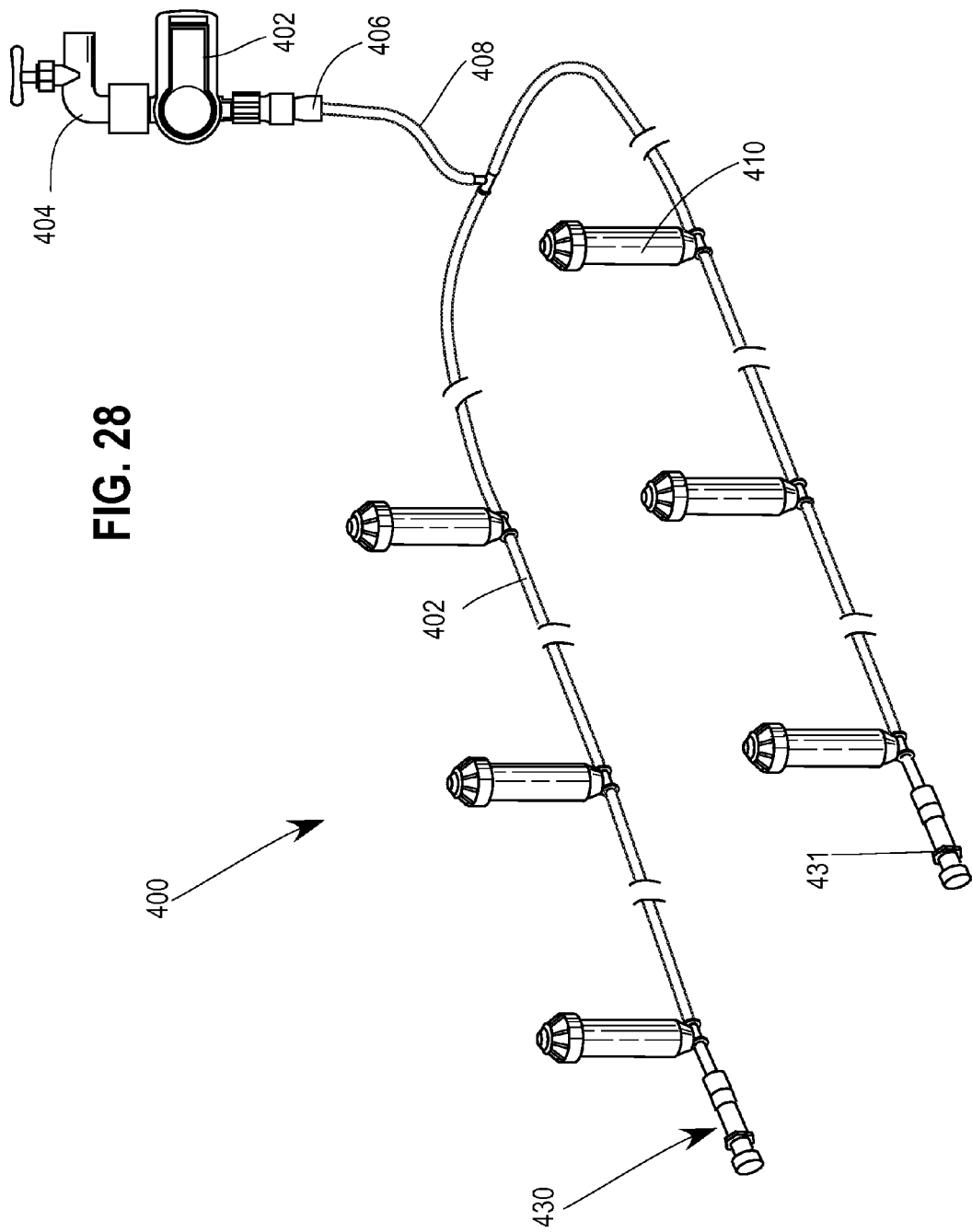
FIG. 28 is a schematic view of another irrigation system having below-ground sprinklers.
Figure 29:
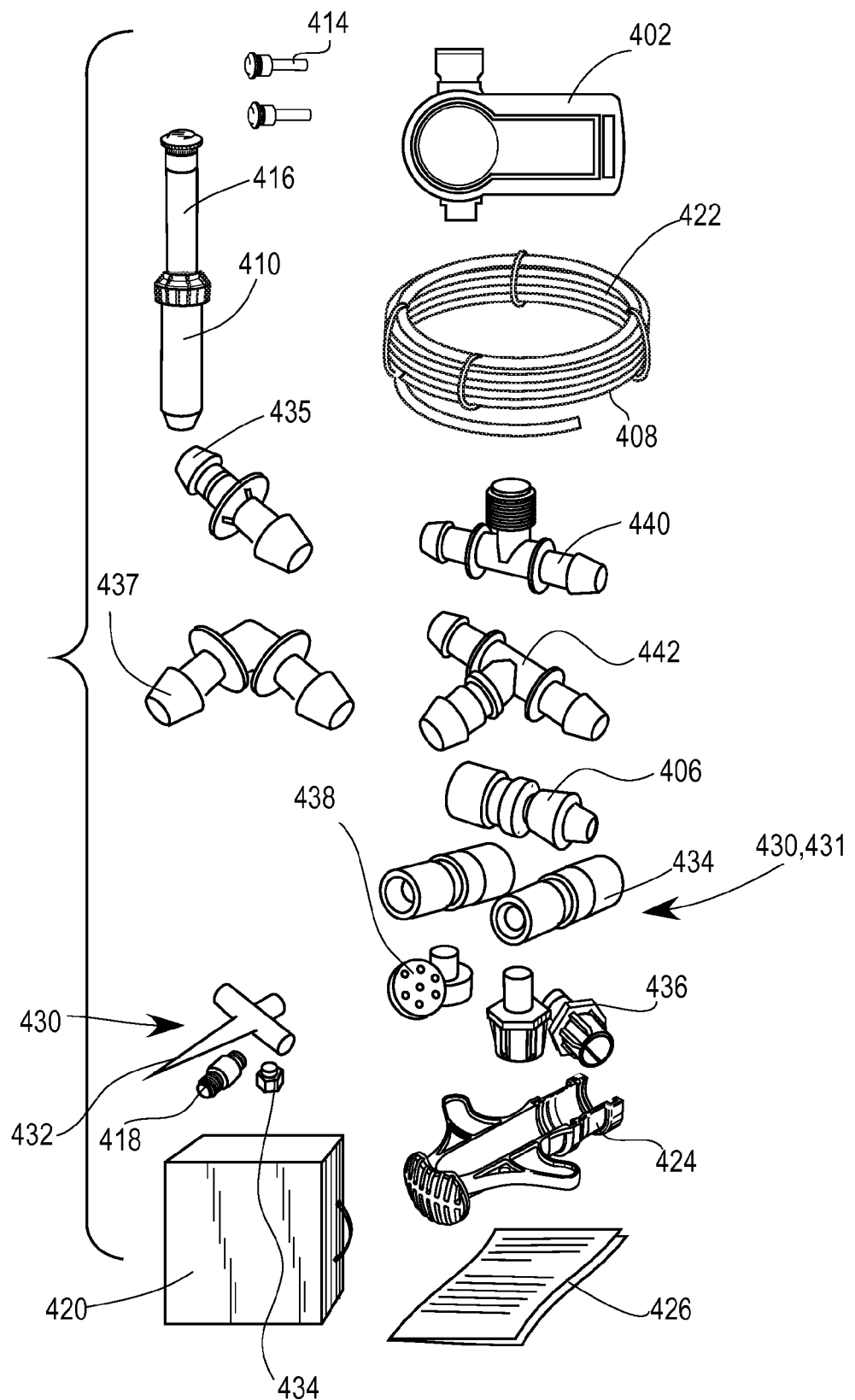
FIG. 29 is an exploded view of the irrigation system of FIG. 28.

With reference to FIGS. 28-30, another irrigation system 400 is shown that has many similar components as system 10 and may be installed in a manner similar to system 10 such that differences between the two will be highlighted. For example, the irrigation system 400 includes a timer 402 for connecting to a faucet 404, a distribution tubing connector 406 for connecting tubing 408 to the timer 402, and both below ground sprinklers, such as pop-up sprinklers 410 (see FIG. 28) and above ground sprinklers, such as sprinklers 412 (see FIG. 30). With reference to FIG. 29, the sprinklers 410, 412 share interchangeable sprinkler nozzles 414 that may be moved from a riser head 416 of the sprinkler 410 to a riser 418 (and adapter 434 thereon) of the sprinkler 412, as discussed in greater detail below. The ability to use above ground sprinklers 410, below ground sprinklers 412, or a combination of above and below ground sprinklers 410, 412 provides additional flexibility for the irrigation system 400.

Figure 34:
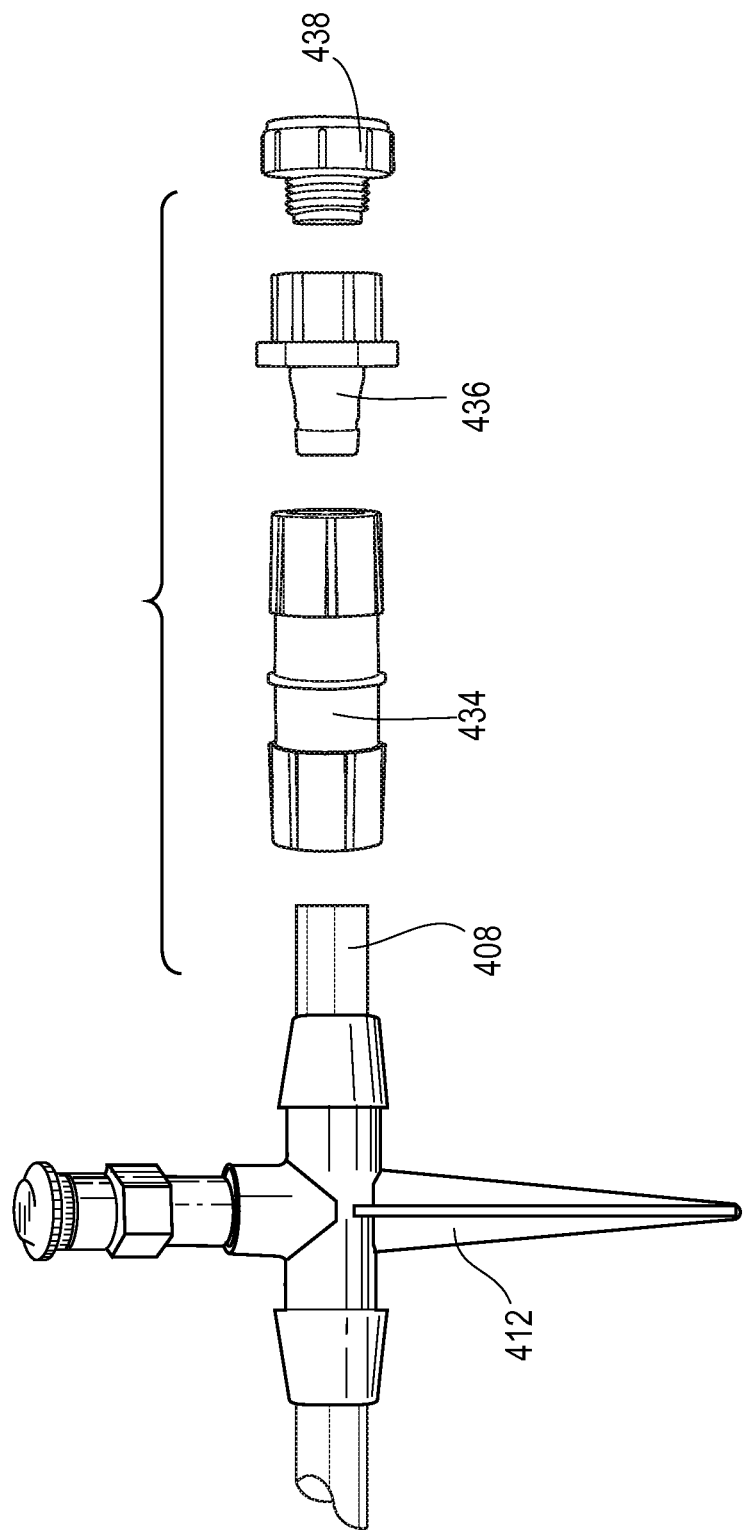
FIG. 34 is an exploded view of a portion of the irrigation system of FIG. 30.

With reference to FIG. 29, the system 400 includes a container 420 that receives the other components of the irrigation system 400. The other components include a coil 422 of the tubing 408, a barb insertion tool 424, instructions 426, and drain valve assemblies 430, 431. The drain valve assemblies 430, 431 include compression couplings 434, female pipe adaptors 436, and automatic drain valves 438 that are installed onto the tubing 408 as shown in FIG. 34 in a manner similar to the other drain valve assemblies discussed above. The container 420 further receives a sprinkler body 430 of the sprinkler 412. The sprinkler body 430 includes a spiked tee 432, the riser 418, and the nozzle adaptor 434. Also received in the container 420 are barbed couplings 435, barbed elbows 437, threaded and barbed tees 440, and barbed tees 442.

With reference to FIGS. 31-33, a process for assembling the sprinklers 412 is shown. Initially, the tubing 408 is positioned above ground and cut at the desired sprinkler locations, generally as discussed above with respect to FIGS. 14 and 17. The tubing 408 is cut to form tubing sections 450, 452 on either side of the spiked tee 432, as shown in FIG. 31. The spiked tee 432 includes compression coupling portions 454, 456 that are configured to permit the tubing sections 450,452 to be advanced in directions 458, 460 into engagement with the spiked tee 432. The spiked tee 432 has a socket 462 with inner threads 464, and the riser 418 has a first threaded male portion 466 that is threaded into and engaged with the spike socket 462. The nozzle adaptor 434 is then threaded onto a second threaded male portion 468 of the riser 418. Next, one of the nozzles 414 of the system 400 is disengaged from a riser 470 (see FIG. 32) of the sprinkler 410 by turning the nozzle 414 and screen 472 connected thereto in direction 474. The nozzle 414 may then be connected to the sprinkler 412 by advancing the screen 472 in direction 478 into an opening 480 of a socket 482 of the adaptor 434. The nozzle 414 is configured to thread onto the socket 482 of the adapter 434 and be secured therewith. Once the nozzle 414 is secured to the nozzle adaptor 434, the sprinkler 412 is ready for use. In another approach, the nozzle 414 may not need to be removed from the sprinkler 410. For example, the system 400 may include the sprinklers 410 pre-loaded with low flow nozzles 414 and the spare nozzles 414 (see FIG. 29) include high-flow nozzles 414. If the user wants to use the high-flow nozzles with the sprinklers 412, the user simply removes the high flow nozzles 414 from the container 420 and secures the high flow nozzles 414 to the nozzle adaptors 434 as discussed above without having to remove nozzles 414 from the sprinklers 410.

Figure 35:
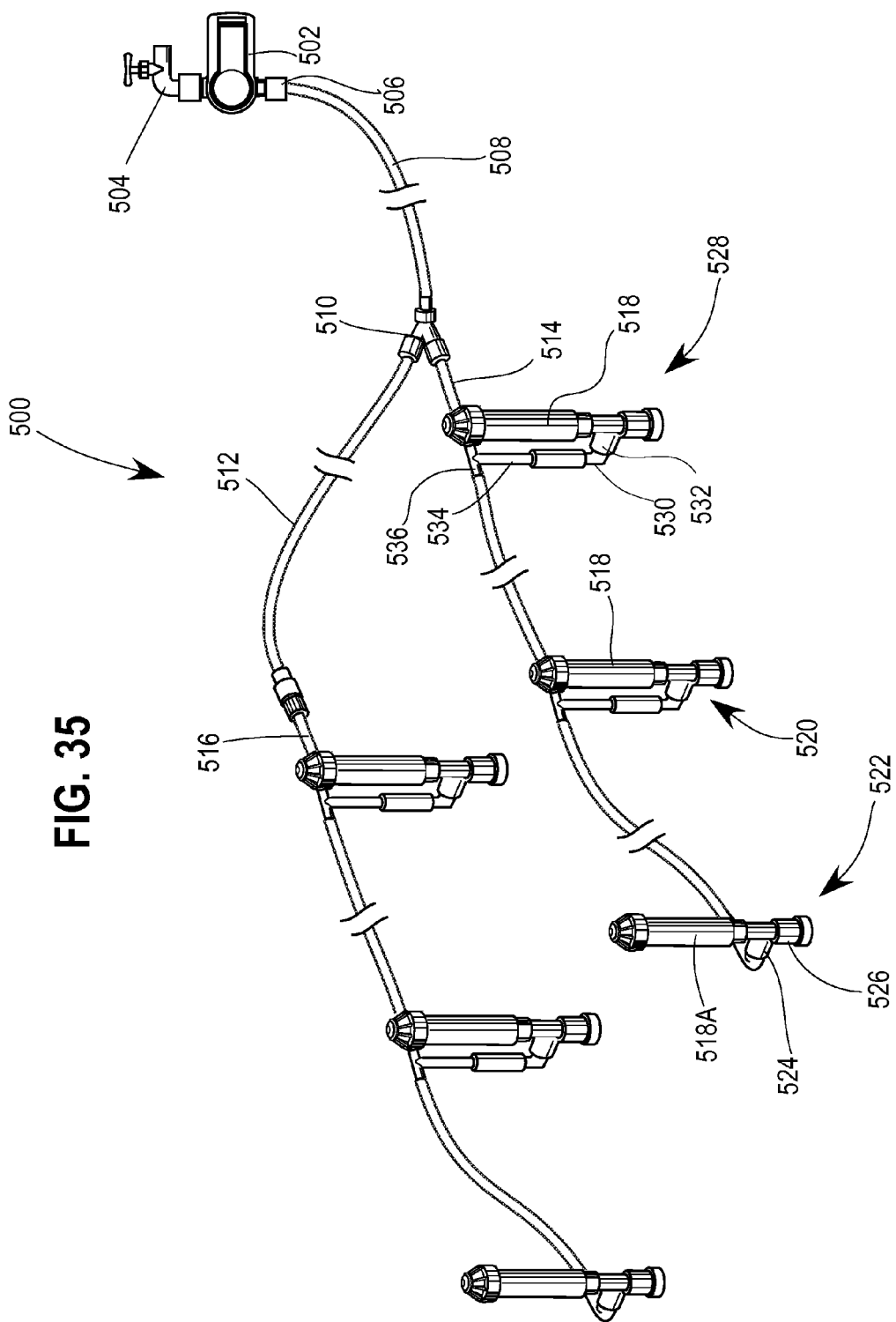
FIG. 35 is a schematic view of another irrigation system.
Figure 36:
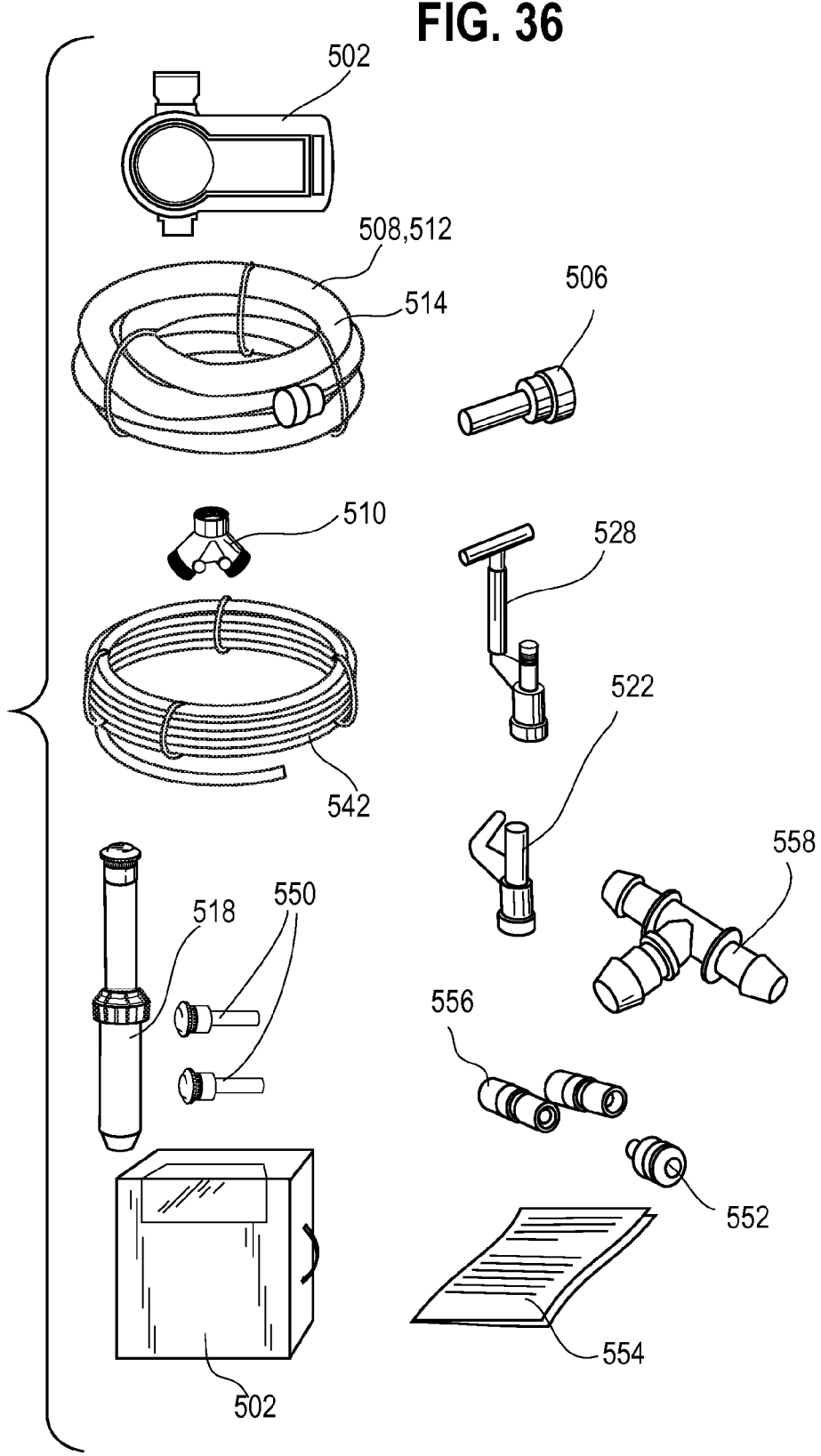
FIG. 36 is an exploded view of the irrigation system of FIG. 35.

With reference to FIGS. 35 and 36, an irrigation system 500 is provided that is similar in many respects to the irrigation systems discussed above and may be installed in a manner similar to the sprinkler systems discussed above such that differences from the sprinkler systems discussed above will be highlighted. The irrigation system 500 includes a timer 502 for connecting to a faucet 504, a hose-to-pipe connector 506, and a primary hose 508 that connects to a hose splitter 510. The hose splitter 510 splits water flow between a secondary hose 512 and a first tubing section 514. The hoses 508, 512 may be positioned above ground and generally be more rigid than the tubing section 514. The hose 512 is connected to a second tubing section 516.

Positioned along the first and second tubing 514, 516 are sprinklers 518. The sprinklers 518 have connectors 520 for connecting the sprinklers 518 to the tubing 514, 516. The connectors 520 have housings configured to resist tilting of the sprinklers 518 once the sprinklers 518 have been buried below ground as discussed in greater detail below. At the ends of the tubing 514, 516, there are sprinklers 518A with end connectors 522 for connecting the sprinklers 518A to the tubing 514, 516. Each end connector 522 includes a lateral fitting portion 524 configured to engage the ground and resist movement of the sprinklers 518A and a drain valve 526 configured to permit water to drain out of the system 500 once the system 500 has been depressurized. The sprinklers 518 also include intermediate sprinklers 518B with inline connectors 528 for connecting the sprinklers 518B to the tubing 514, 516. The inline connector 528 includes a J-fitting 530 with a lateral spacer portion 532 and a vertical riser portion 534 that is connected to a tee portion 536. The tee portion 536 receives fluid from the tubing 514, 516.

With reference to FIG. 36, the system 500 includes a container 502 that receives the other components of the system 500. The hoses 508, 512 may be stored in a coil 540 and the tubing for the sections 514, 516 may be stored in a coil 542. The hoses 508, 512 are two separate hoses coiled together which permits the hoses 508, 512 to have preassembled fittings as is common in irrigation hoses, such as garden hoses. In contrast, the tubing coil 542 may be a single piece of tubing and the sections 514, 516 are cut from the coil 542 to desired lengths. The tubing sections 514, 516 are connected to the sprinklers 518 using various connectors as discussed above.

The container 502 also receives nozzles 550 of different flow characteristics that may be used with the sprinklers 518 as desired by the user. The nozzles 550 may include a full circle pattern nozzle 552 for use in center-of-yard watering applications. The container 502 further includes instructions 554 for installing the irrigation system 500, couplings 556 to repair or extend the tubing 514, 516, and barbed tees 558 for connecting the underground distribution tubing 514, 516.

Figure 37:
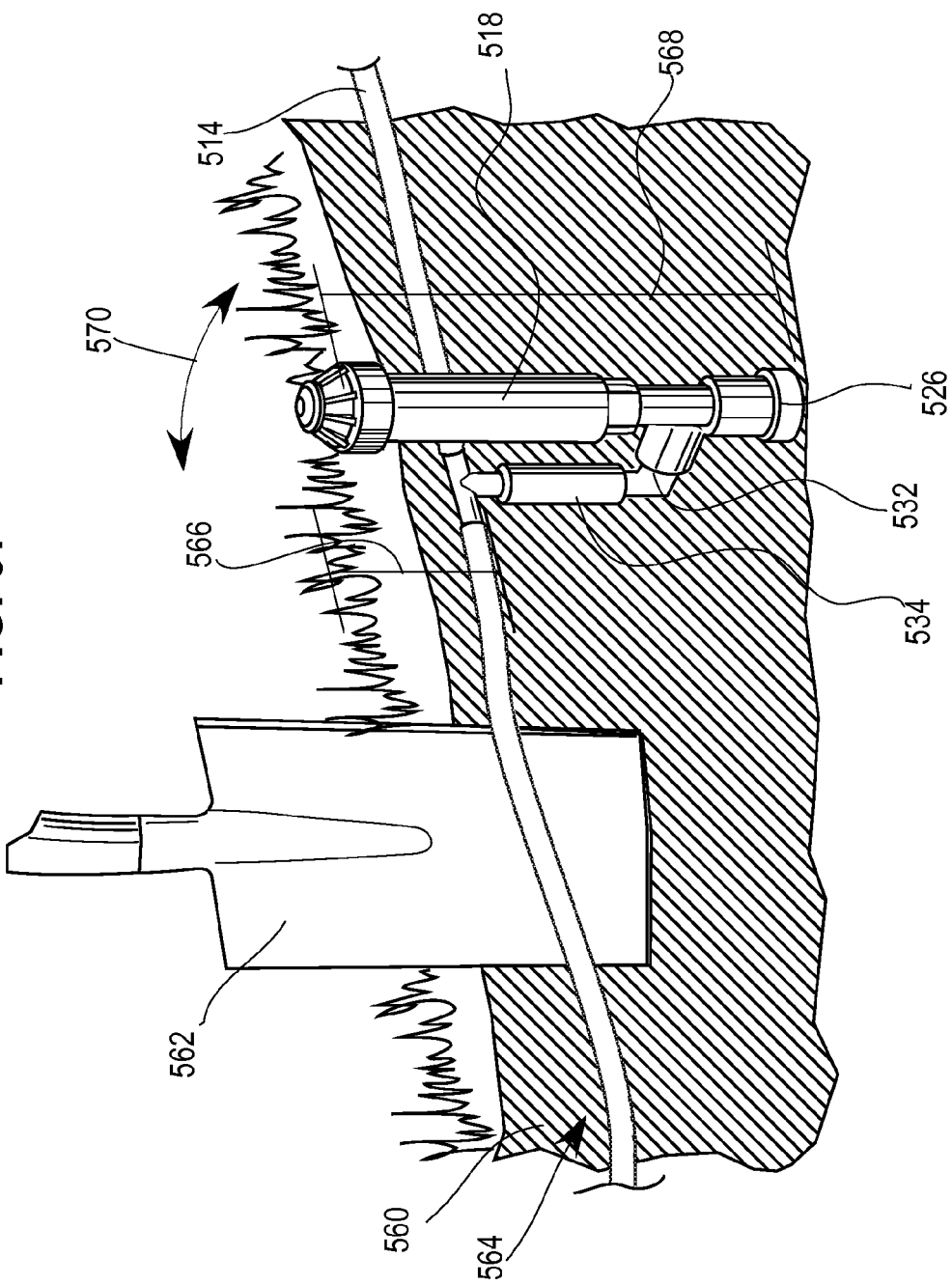
FIG. 37 is a perspective view of a sprinkler of the system of FIG. 35 being installed.

With reference to FIG. 37, the tubing 514, 516 is buried in the ground 560 by first working a flat shovel 562 back and forth within the ground 560 to form a trench 564. The trench 564 has a tubing depth 566 and a deeper, sprinkler depth 568 at the sprinklers 518. The tubing 514, 516, with sprinklers 518 connected thereto are then positioned in the trench 564. The sprinklers 518 have lateral spacer portions 532 that rest on the ground within the trench 564 and restrict lateral movement or wobbling of the sprinkler 518 in direction 570. The trench 564 is then filled in with soil to bury the tubing 514, 516 and the sprinklers 518 with the soil filled on top of the sprinkler lateral spacer portions 532 further securing the sprinklers 518 within the ground 560. Thus, the sprinklers 518 have a reduced tendency to tilt or move after the trench 564 has been filled in.

With reference to FIGS. 38-41, the container 60 of the system 10 is discussed in greater detail. Although the container 60 is discussed with respect to system 10, it will be appreciated that the other containers 370, 420, 502 may take the form of the container 60. The container 60 includes an outer container 600 and an inner container 602. The outer container 600 may be made of, for example, cardboard sufficiently strong to support and protect the components of the system 10 during transport and storage of the system 10. The inner container 602 may be made of a transparent material, such as rigid plastic, and have a clam shell-like configuration. The inner container 602 is configured to securely contain the sprinklers 20 and timer 12 in an organized, side-by-side positions. For example, the inner container 602 may have two halves with individual compartments for each of the sprinklers 20 and timer 12. The sprinklers 20 and timer 12 are each loaded into the compartments of one of the halves of the inner container 602 and the other half of the inner container 602 is connected to the half with the sprinklers 20 and timer 12 therein. The surfaces of the compartments engage the sprinklers 20 and timer 12 and hold the sprinklers 20 and 12 at predetermined orientations within the inner container 602.

Figure 38:
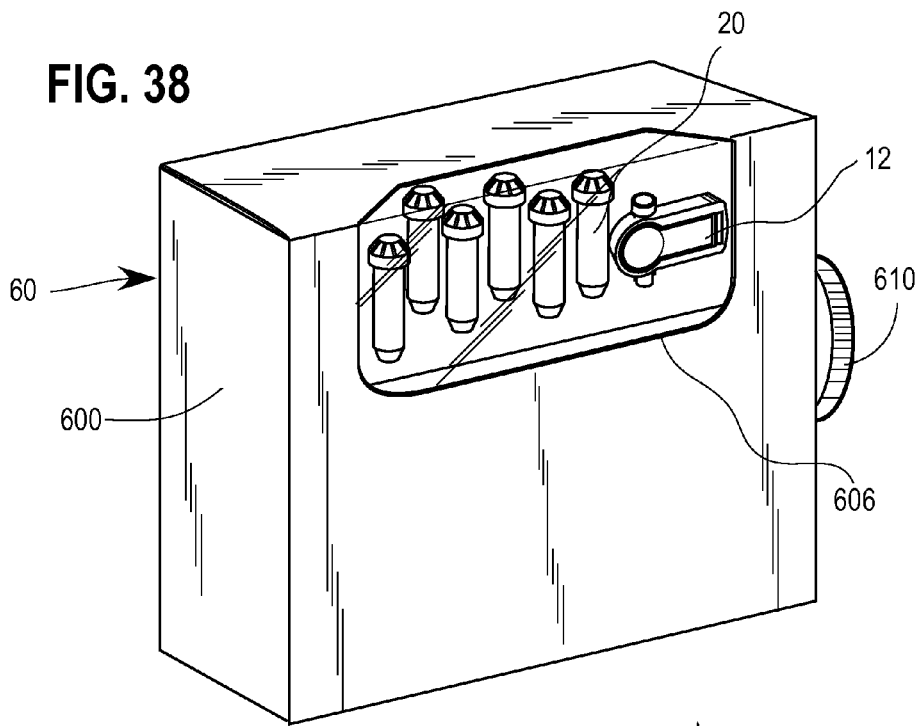
FIG. 38 is a perspective view of a container of the irrigation system of FIG. 1.
Figure 39:
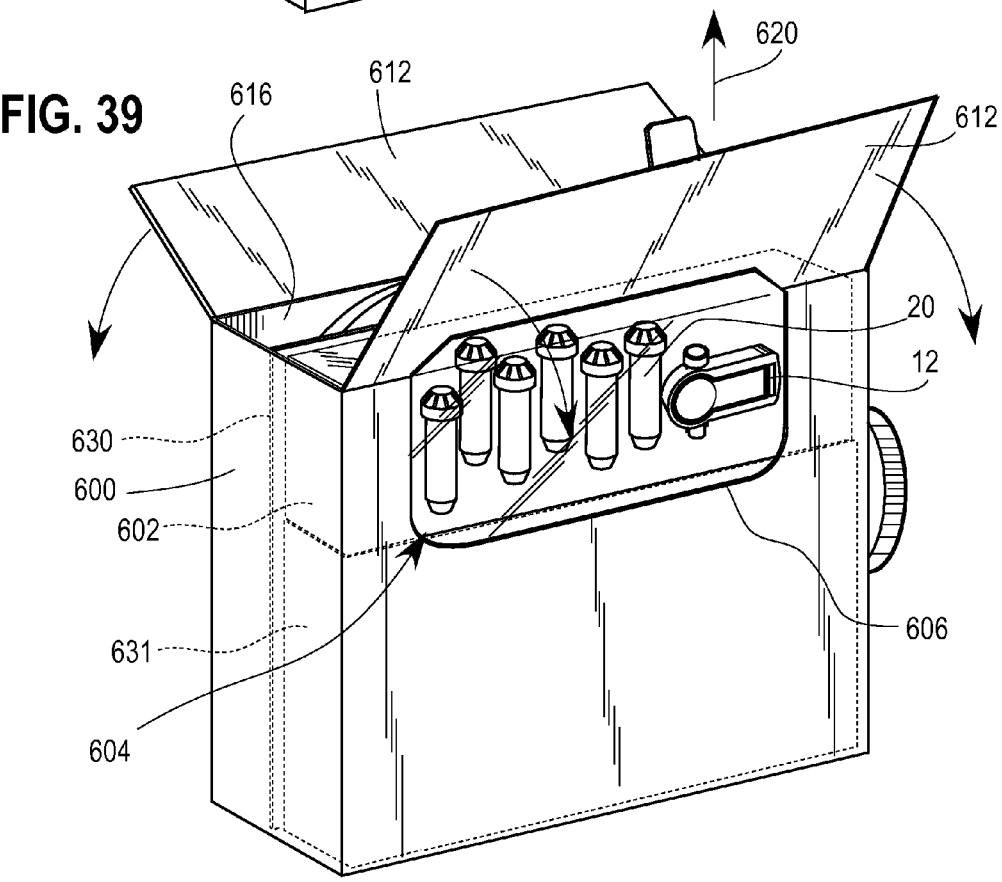
FIG. 39 is a perspective view of the container of FIG. 38 showing a lid of the container in an open configuration.

With reference to FIG. 39, the outer container 600 has a window 604 that permits a consumer to readily view the sprinklers 20 and timer 12 within the container 60. In one form, the window 604 is an opening 606 in the container 600 overlapping the transparent material of the inner container 602. In another form, the window 604 is made of a transparent material. With reference to FIG. 38, the outer container 600 may have a handle 610 that permits a consumer to easily lift and transport the container 60 and the components of the system 10 therein. The handle 610 may take a variety of forms, such as a separate handle anchored to the outer container 600 or a handle formed by cutouts in the outer container 600.

With reference to FIG. 39, the outer container 600 may be opened by separating flaps 612, 614 to form an opening 616 of the outer container 600. A purchaser may generally remove the components of the system 10 from the outer container 600 by withdrawing the components from the outer container 600 in direction 620 through the opening 616.

Figure 40:
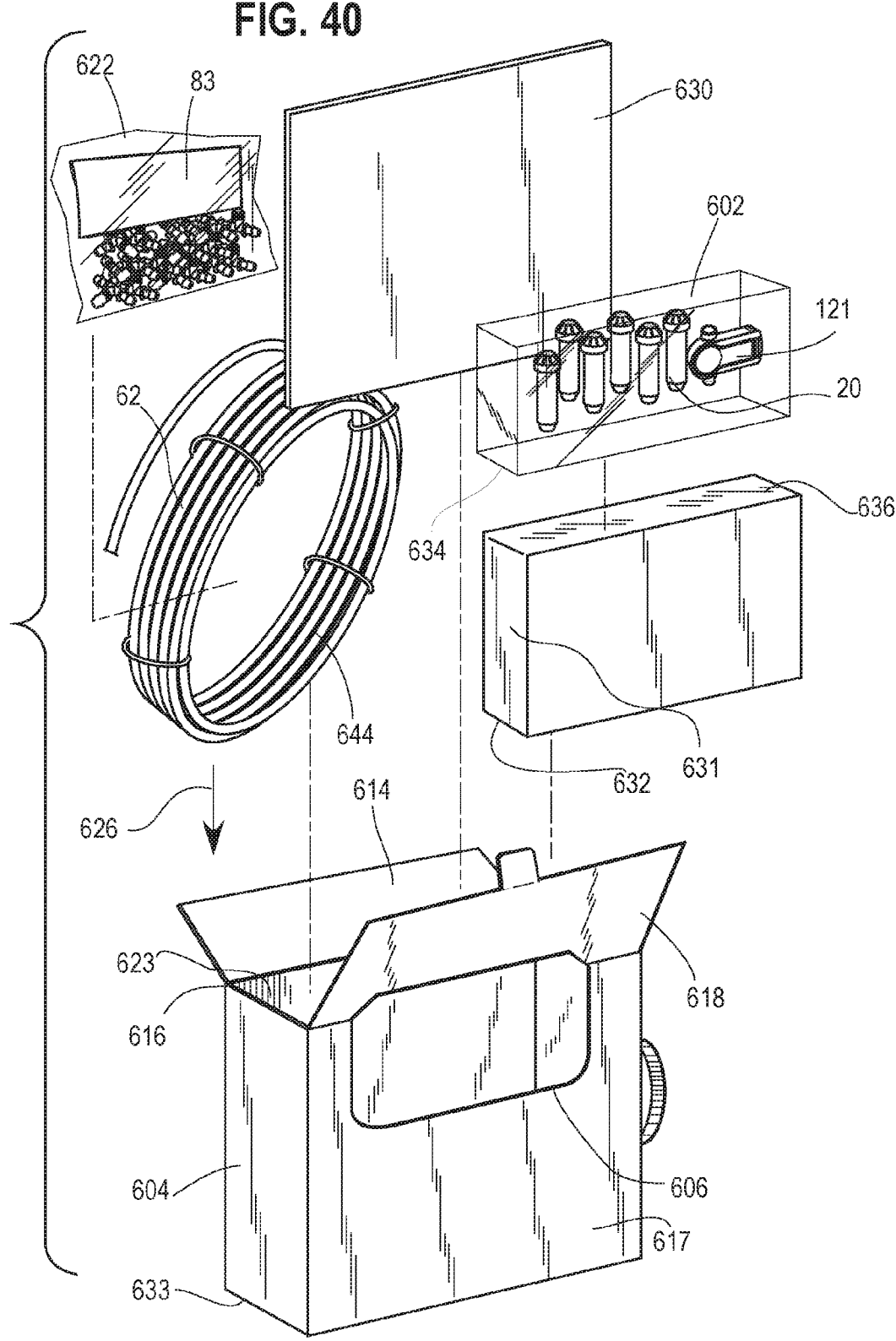
FIG. 40 is an exploded view of the container of FIG. 38.

With reference to FIGS. 2 and 40, system 10 includes connectors such as the threaded and barbed tees 64, barbed tees 66, barbed couplings 68 and barbed elbows 70. These are relatively small components that may be contained within a connector container, such as a bag 622 (see FIG. 40). The container 600 further receives the instructions 83 positioned within the bag 622.

During manufacture of the system 10, the outer container 600 is assembled and configured such that the flaps 612, 614 are in the open configuration shown in FIG. 40. The bag 622 is positioned in a void 644 of the coil 62 of tubing 36. With the bag 622 positioned within the coiled tubing void 644, the assembled bag 622 and tubing coil 62 are advanced in direction 626 into the opening 616 of the outer container 600, as shown in FIG. 40. The coiled tubing 62 and bag 622 are advanced into the opening 616 toward a rear wall 623 of the outer container 600, as shown in FIG. 41.

Figure 41:
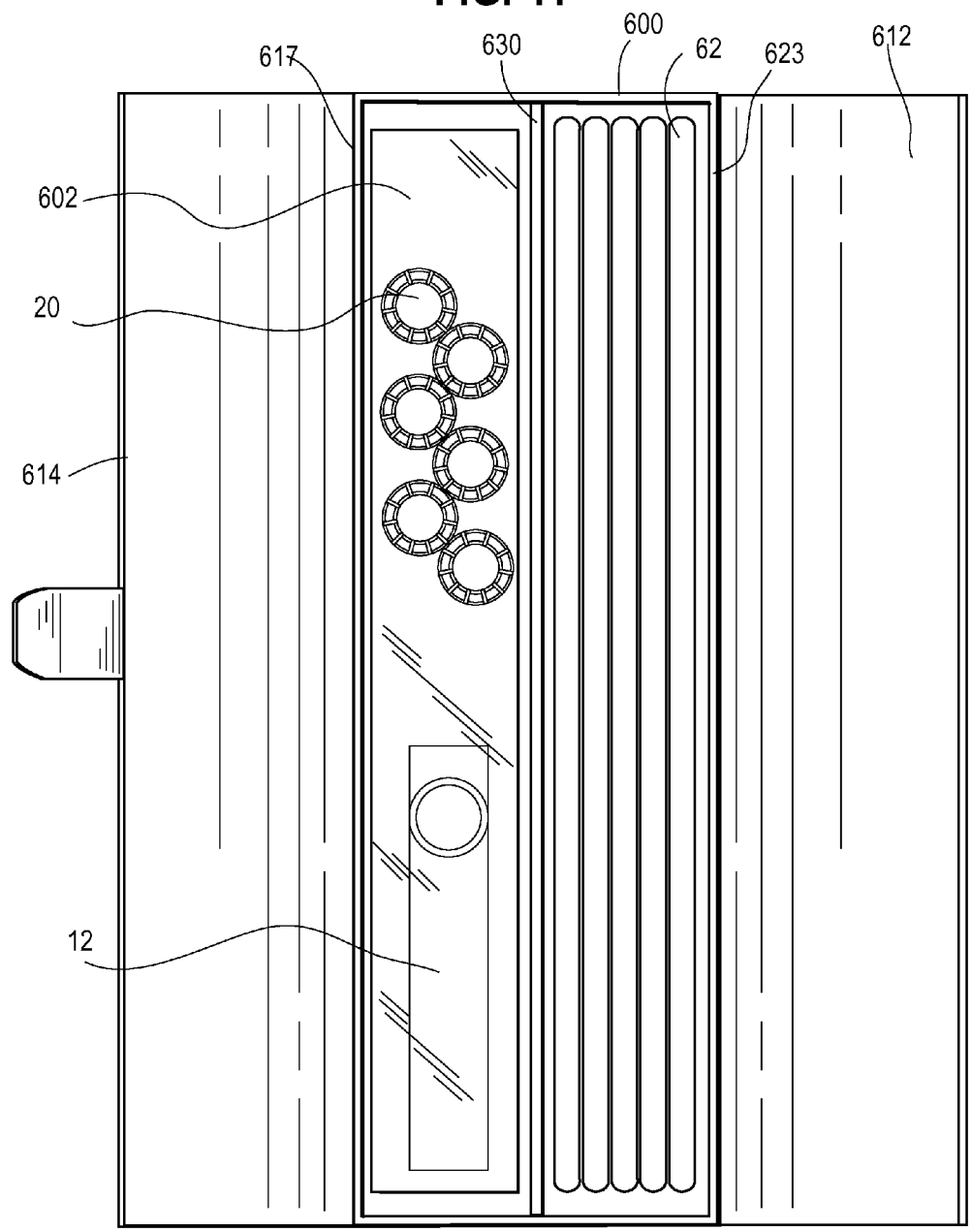
FIG. 41 is a top plan view of the container of FIG. 38 with the lid of the container open.

Next, a partition 630 is advanced in direction 626 into a middle area of the outer container 600 next to the coiled tubing 62 and bag 622 therein as shown in FIG. 41. The coiled tubing 62 and the bag 622 are thereby captured in the coiled tubing void 644 between the partition 630 and a rear wall 623 of the outer container 600. Thus, the container rear wall 623 and partition 630 restrict fore-and-aft movement of the bag 622 outward from the coiled tubing void 644 within the outer container 600.

With reference to FIG. 40, a support 631 is advanced in direction 622 through the outer container opening 616 until a lower face 632 of the support 631 rests on a lower wall 633 of the outer container 600. The support 631 is advanced into the container opening 616 toward a front 617 of the container 600 and on an opposite side of the partition 630 from the coiled tubing 62. The support 631 maintains the inner container 602 at a predetermined height within the outer container 600 such that the sprinklers 20 and timer 12 are visible through the window 604 of the outer container 600. Once the support 631 is within the container 600, the inner container 602 is advanced in direction 626 into the outer container opening 616. The inner container 602 is advanced into the outer container 600 until a lower surface 634 of the inner container 602 rest upon an upper surface 636 of the support 631.

The support 631 may take a variety of forms, such as a cardboard box. In another approach, the support 631 may include a portion of the partition 630 such as a cantilevered portion for supporting the inner container 602. In another approach, the support 631 may include plastic bands such as zip ties which fix the inner container 602 to the outer container 600 or the partition 630. In yet another approach, the support 631 may include interlocking features of the outer container 600 and inner container 602 that maintain the inner container 602 at a predetermined position within the outer container 600.

Figure 42:
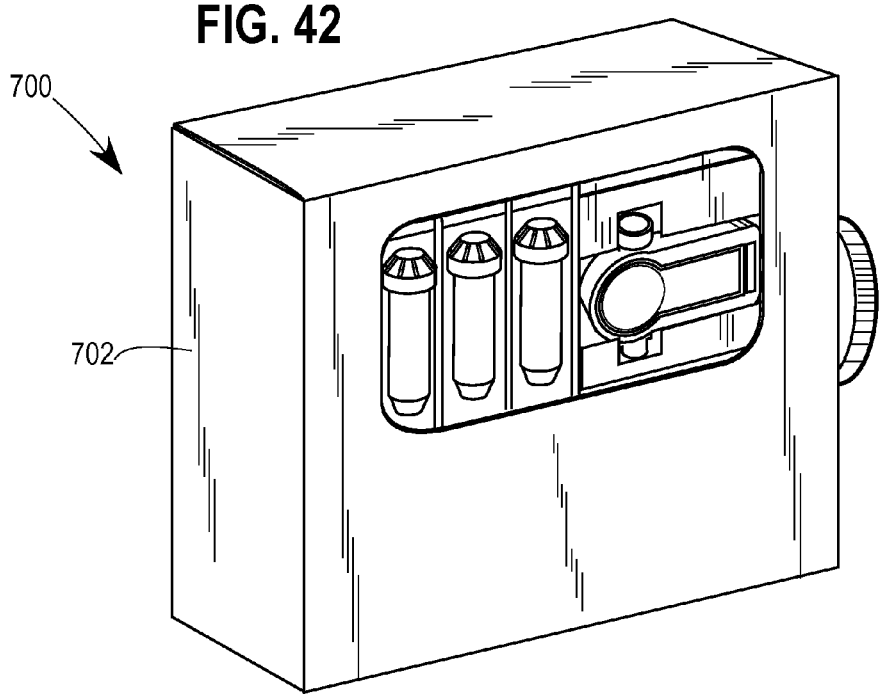
FIG. 42 is a perspective view of another container for the irrigation system of FIG. 1.
Figure 43:
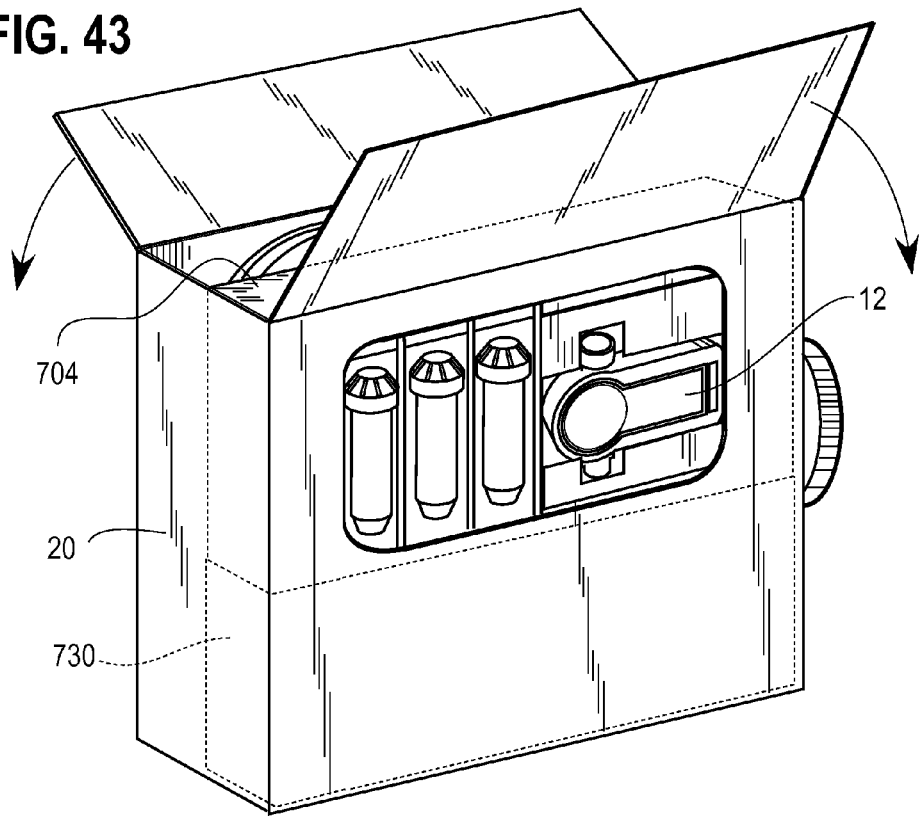
FIG. 43 is a perspective view of the container of FIG. 42 showing a lid of the container in an open configuration.

With reference to FIGS. 42-43, another container 700 is shown that may be used in place of the container 60 with the irrigation system 10 or with any of the other irrigation systems discussed above. Like the container 600, the container 700 maintains the components of the system 10 in a predetermined arrangement within the container 700. Differences between the container 700 and the container 600 will be highlighted in the following discussion.

The container 700 includes an outer container 702 that contains the other components of the irrigation system 10 and an inner container 704 that holds the sprinklers 20 and the timer 12. The inner container 704 is different from the inner container 602 because the inner container 704 is made of an opaque material such as cardboard. Rather than using transparent properties of the material of this inner container 704 to display the sprinklers 20 and timer 12, the inner container 704 has compartments 706, 708, 710 (see FIG. 44) that each receives a pair of the sprinklers 20 and orients the sprinklers 20 to face outwardly from the inner container 704. The sprinkler heads 20 may be retained in the compartments 706, 708, 710 by way of twist ties, tape, or other approaches. The inner container 704 further concludes a compartment 712 that holds the timer 12.

Figure 44:
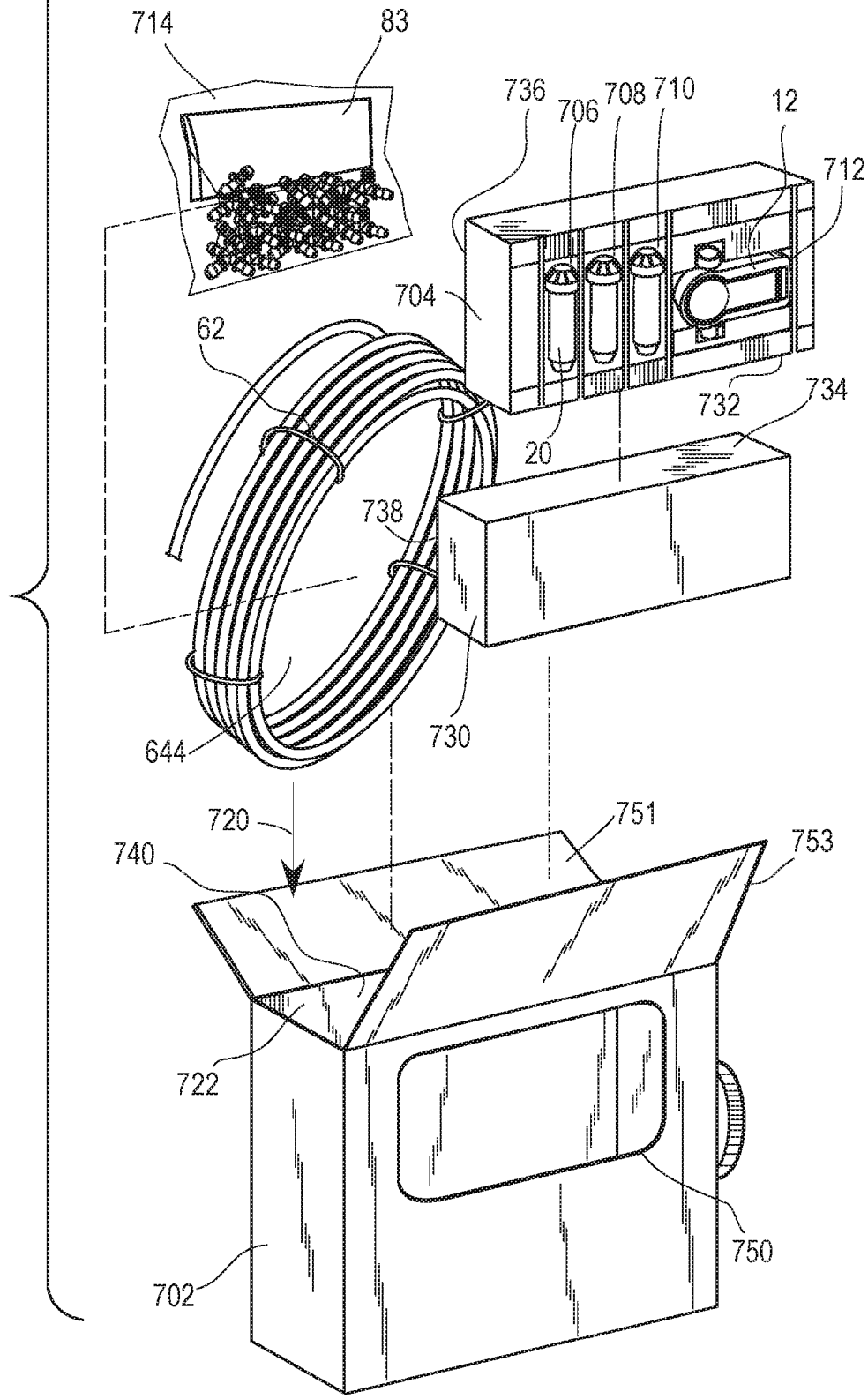
FIG. 44 is an exploded view of the container of FIG. 42.

Like the container 60 discussed above, the container 700 includes a connector container, such as a bag 714, which holds the instructions 83 and the threaded and barbed tees 64, the barbed tees 66, and the barbed coupling 68, as shown in FIG. 44. During assembly of the container 700, the bag 714 is positioned within the interior void 644 of the coiled tubing 62. The coiled tubing 62 and bag 714 received therein are loaded in direction 720 through an opening 722 of the outer container 702.

It is noted that the container 700 may not include a partition, such as the partition 630. Instead, the container 700 has a support 730 that is advanced in direction 720 though the opening 722 of the outer container 702. The inner container 704 is positioned on the support 730 with a lower surface 732 of the inner container 704 resting on an upper surface 734 of the support 730. The support 730 elevates the inner container 704 such that the sprinkler heads 20 and the timer 12 are aligned with a window such as a transparent wall portion of the outer container 702 or an opening 750. Further, the inner container 704 and the support 730 have corresponding back walls 736, 738 that operate in combination with a back wall 740 of the outer container 702 to restrict fore-and-aft movement of the bag 714 out of the tubing inner void 644. In this manner, the container 700 securely and attractively holds the timer 12, sprinklers 20, coiled tubing 62, and bag 82 once they have been loaded into the outer container 702 and the flaps 751, 753 of the outer container 702 secured in a closed configuration.

While the foregoing description is with respect to specific examples, those skilled in the art will appreciate that there are numerous variations of the above that fall within the scope of the concepts described herein and the appended claims.

What is claimed is:

1. A faucet-supplied irrigation system comprising:
a container;
coiled tubing in the container, the tubing having a length and a sidewall, the sidewall having a circular cross-section transverse to the length of the tubing;
a plurality of pop-up sprinklers in the container;
a plurality of connectors in the container for attachment to the tubing and sprinklers, the connectors including clampless sprinkler connectors adapted to engage the tubing sidewall and connect the sprinklers to the tubing;
an irrigation controller in the container, the controller having a microprocessor to control a supply of water to the sprinklers through the tubing from a faucet;
a pressure regulator in the container to regulate water pressure of the supply of water to the sprinklers through the tubing from the faucet;
the container being configured to maintain a plurality of the coiled tubing, pop-up sprinklers, connectors, controller and regulator in a predetermined arrangement within the container; and
instructions in the container for installing the irrigation system, the instructions including instructions to connect the sprinklers to the tubing via the clampless sprinkler connectors, instructions to dig a trench, instructions to position at least one of the sprinklers and the tubing in the trench, and instructions to bury the at least one of the sprinklers and the tubing in the trench.

2. The irrigation system of claim 1 wherein the container includes at least one outer container and at least one inner container inside the at least one outer container.

3. The irrigation system of claim 2 wherein at least one of the inner and outer containers includes a window.

4. The irrigation system of claim 2 wherein the at least one inner and outer containers both include a window, and the windows of each overlap at least in part.

5. The irrigation system of claim 4 wherein the at least a window is either transparent material or a void of material.

6. The irrigation system of claim 4 wherein at least one of the plurality of sprinklers in the container being visible through the overlapped windows.

7. The irrigation system of claim 6 wherein at least one of the plurality of sprinklers and the controller being visible through the overlapped windows.

8. The irrigation system of claim 2 wherein the at least one inner container includes a plurality of inner containers.

9. The irrigation system of claim 2 comprising a support in the at least one outer container to position the at least one inner container in the at least one outer container.

10. The irrigation system of claim 1 comprising at least one automatic drain valve in the container for being connected to the tubing, the at least one drain valve configured to close in response to receiving pressurized water from the tubing.

11. The irrigation system of claim 10 wherein the plurality of connectors in the container includes at least one connector to connect the at least one drain valve in line with at least a portion of the tubing.

12. The irrigation system of claim 10 wherein the plurality of connectors in the container includes at least one tee connector to connect the at least one drain valve along at least a portion of the tubing.

13. The irrigation system of claim 10 wherein the at least one drain valve includes a plurality of drain valves in the container.

14. The irrigation system of claim 1 wherein at least one of the clampless sprinkler connectors includes two barbs for interconnecting two portions of the flexible tubing and a threaded connection for connecting to one of the sprinklers.

15. The irrigation system of claim 14 wherein the plurality of connectors in the container includes at least one barbed tee connector, at least one barbed inline connector, and at least one barbed elbow connector.

16. The irrigation system of claim 15 wherein the plurality of connectors in the container includes at least one threaded elbow connector for connecting to one of the sprinklers and at least one adapter with a barbed end for connecting a portion of the flexible tubing and a threaded end for connecting to the at least one threaded elbow connector.

17. The irrigation systems of claim 1 wherein at least one of the plurality of sprinklers has an adjustable arc of coverage.

18. The irrigation system of claim 1 wherein the plurality of sprinklers includes at least one sprinkler having a rotor.

19. The irrigation system of claim 18 further comprising a plurality of nozzles in the container configured for use with the at least one sprinkler having a rotor, the plurality of nozzles including nozzles with ports sized to produce different flow rates.

20. The irrigation system of claim 1 further comprising a back flow preventer in the container.

21. The irrigation system of claim 1 further comprising a filter in the container.

22. The irrigation system of claim 1 further comprising an adapter in the container with a threaded connection and a barbed connection.

23. The irrigation system of claim 1 comprising a multi-function connector in the container having inline a filter, the pressure regulator, a threaded connector and a barbed connector.

24. The irrigation system of claim 23 wherein the multi-function connector includes a back flow preventer.

25. The irrigation system of claim 1 further comprising at least one installation tool in the container.

26. The irrigation system of claim 25 wherein the at least one installation tool includes a barbed connector insertion tool.

27. The irrigation system of claim 25 wherein the at least one installation tool includes a sprinkler adjustment tool.

28. The irrigation system of claim 1 comprising at least one stake in the container for temporarily supporting at least one of the sprinklers.

29. The irrigation system of claim 1 comprising at least one stake in the container for permanently supporting one of the sprinklers.

30. The irrigation system of claim 1 wherein at least one of the sprinklers comprises a ground supportable housing.

31. The irrigation system of claim 1 wherein the pressure regulator limits water pressure to a maximum downstream of the pressure regulator so that the rotors of the pop-up sprinklers do not mist during operation.

32. The irrigation system of claim 31 wherein the pressure regulator limits water pressure to a maximum of about 45-55 psi.

33. The irrigation system of claim 1 wherein the instructions in the container include instructions to position both of the sprinklers and the tubing in the trench and instructions to bury the sprinklers and the tubing in the trench.

34. The irrigation system of claim 1 wherein the instructions in the container include instructions for separating sections of tubing from the coiled tubing, positioning the sections of tubing in the trench, and burying the sections of tubing.

35. The irrigation system of claim 1 wherein the instructions in the container include instructions to separate sections of tubing from the coiled tubing, instructions to position the sprinklers and the sections of tubing in the trench, and instructions to bury the plurality of sprinklers and the sections of tubing in the trench.

36. A faucet-supplied irrigation system comprising:
a container;
coiled tubing in the container configured to be separated into sections having end portions;
a plurality of pop-up sprinklers in the container;
a plurality of connectors in the container for attachment to the tubing and sprinklers, the connectors having connecting portions with barbs;
an irrigation controller in the container, the controller having a microprocessor to control a supply of water to the sprinklers through the tubing from a faucet;
a tool having a member configured to be inserted into tubing end portions to prepare the tubing end portions to be advanced over the connector barbs and provide a secure attachment of the tubing end portions to the connector connecting portions without the use of clamping devices to secure the tubing to the connectors;
a plurality of stakes in the container; and
a plurality of ties in the container configured to releaseably connect the sprinklers to the stakes.

37. The irrigation system of claim 36 wherein the container is configured to maintain a plurality of the coiled tubing, pop-up sprinklers, connectors, and irrigation controller in a predetermined arrangement within the container.

38. The irrigation system of claim 36 wherein the container includes at least one outer container and at least one inner container inside the at least one outer container.

39. The irrigation system of claim 38 wherein at least one of the inner and outer containers includes a window.

40. The irrigation system of claim 39 wherein at least one of the plurality of sprinklers and the controller being visible through the overlapped windows.

41. The irrigation system of claim 38 wherein the at least one inner and outer containers both include a window, and the windows of each overlap at least in part.

42. The irrigation system of claim 41 wherein the window is either transparent material or a void of material.

43. The irrigation system of claim 36 wherein the container includes a transparent portion comprising either transparent material or a void of material; and
at least one of the plurality of sprinklers in the container being visible through the window.

44. A faucet-supplied irrigation system comprising:
a container;
coiled tubing in the container configured to be separated into sections;
a plurality of pop-up sprinklers in the container;
a plurality of connectors in the container for attachment to the tubing and sprinklers;
an irrigation controller in the container, the controller having a microprocessor to control a supply of water to the sprinklers through the tubing from a faucet;
a plurality of stakes in the container; and
a plurality of ties in the container configured to releaseably connect the sprinklers to the stakes.

45. The irrigation system of claim 44 further comprising instructions in the container for installing the irrigation system, the instructions including instructions to dig a trench, instructions to position at least one of the sprinklers and the tubing in the trench, and instructions to bury the at least one of the sprinklers and the tubing in the trench.

46. The irrigation system of claim 44 further comprising instructions in the container for installing the irrigation system, the instructions including instructions to connect the sprinklers to the stakes using the ties.

47. The irrigation system of claim 44 wherein the container is configured to maintain a plurality of the coiled tubing, pop-up sprinklers, connectors, and irrigation controller in a predetermined arrangement within the container.

48. The irrigation system of claim 44 wherein the container includes at least one outer container and at least one inner container inside the at least one outer container.

49. The irrigation system of claim 48 wherein at least one of the inner and outer containers includes a window.

50. The irrigation system of claim 49 wherein the at least one inner and outer containers both include a window, and the windows of each overlap at least in part.

\* \* \* \* \*

UNITED STATES PATENT AND TRADEMARK OFFICE
CERTIFICATE OF CORRECTION

| | |
|---|---|
| PATENT NO. | : 9,821,335 B2 |
| APPLICATION NO. | : 14/248087 |
| DATED | : November 21, 2017 |
| INVENTOR(S) | : Robert A. Burrous et al. |

It is certified that error appears in the above-identified patent and that said Letters Patent is hereby corrected as shown below:

In the Claims

Column 15, Line 19, in Claim 17, delete "systems" and insert --system-- therefor.

Column 16, Lines 31-32, in Claim 36, delete "releaseably" and insert --releasably-- therefor.

Column 16, Lines 66-67, in Claim 44, delete "releaseably" and insert --releasably-- therefor.

Signed and Sealed this
Twenty-second Day of May, 2018

Andrei Iancu
*Director of the United States Patent and Trademark Office*